United States Patent
Evans et al.

(10) Patent No.: US 9,614,244 B2
(45) Date of Patent: Apr. 4, 2017

(54) REDOX AND PLATING ELECTRODE SYSTEMS FOR AN ALL-IRON HYBRID FLOW BATTERY

(71) Applicant: ESS TECH, INC., Portland, OR (US)

(72) Inventors: Craig Evans, West Linn, OR (US); Yang Song, West Linn, OR (US)

(73) Assignee: ESS Tech, Inc., Portland, OR (US)

( * ) Notice: Subject to any disclaimer, the term of this patent is extended or adjusted under 35 U.S.C. 154(b) by 516 days.

(21) Appl. No.: 14/019,488

(22) Filed: Sep. 5, 2013

(65) Prior Publication Data

US 2014/0065460 A1    Mar. 6, 2014

Related U.S. Application Data

(60) Provisional application No. 61/778,160, filed on Mar. 12, 2013, provisional application No. 61/697,202, filed on Sep. 5, 2012.

(51) Int. Cl.
*H01M 8/20* (2006.01)
*H01M 8/0258* (2016.01)
(Continued)

(52) U.S. Cl.
CPC .............. *H01M 8/188* (2013.01); *H01M 8/20* (2013.01); *Y02E 60/528* (2013.01)

(58) Field of Classification Search
CPC ...... H01M 8/20; H01M 8/188; H01M 8/0258; H01M 8/0247
See application file for complete search history.

(56) References Cited

U.S. PATENT DOCUMENTS 4,037,023 A   7/1977  Grehier et al.
4,786,567 A   11/1988 Skyllas-Kazacos et al.
(Continued)

FOREIGN PATENT DOCUMENTS

WO    WO 02/25754      *  3/2002
WO    2011075135 A1       6/2011
WO    2012167057 A2      12/2012

OTHER PUBLICATIONS

Mellentine, J. et al., "Performance Characterization and Cost Assessment of an Iron Hybrid Flow Battery," University of Iceland, University of Akureyri, Jan. 28, 2011, 136 pages.
(Continued)

*Primary Examiner* — Ula C Ruddock
*Assistant Examiner* — Thomas Parsons
(74) *Attorney, Agent, or Firm* — McCoy Russell LLP

(57) ABSTRACT

A system for a flow cell for a hybrid flow battery, comprising: a redox plate comprising a plurality of electrolyte flow channels; conductive inserts attached to the redox plate between adjacent electrolyte flow channels; a redox electrode attached to a surface of the redox plate; a plating electrode, comprising: a plurality of folded fins with an oscillating cross-section, the plurality of folded fins comprising: a first planar surface; a second planar surface, parallel to the first planar surface; a plurality of ridges intersecting the first and second planar surfaces such that the plurality of ridges divide the first planar surface into a first plurality of strips, and divide the second planar surface into a second plurality of strips; and a membrane barrier. In this way, the capacity and performance of hybrid flow batteries may be maximized, through decreasing the reaction kinetics, mass transport and ohmic resistance losses at both electrodes.

19 Claims, 9 Drawing Sheets

(51) Int. Cl.
*H01M 8/0247* (2016.01)
*H01M 8/18* (2006.01)

(56) References Cited

U.S. PATENT DOCUMENTS

| | | | |
|---|---|---|---|
| 5,318,865 A | 6/1994 | Kaneko et al. | |
| 5,368,762 A | 11/1994 | Sato et al. | |
| 5,665,212 A | 9/1997 | Zhong et al. | |
| 6,143,443 A | 11/2000 | Kazacos et al. | |
| 6,228,518 B1 * | 5/2001 | Kindler | H01M 8/0213 429/514 |
| 6,468,688 B2 | 10/2002 | Kazacos et al. | |
| 6,475,661 B1 | 11/2002 | Pellegri et al. | |
| 6,509,119 B1 | 1/2003 | Kobayashi et al. | |
| 6,562,514 B1 | 5/2003 | Kazacos et al. | |
| 6,666,961 B1 * | 12/2003 | Skoczylas | H01M 4/8605 204/242 |
| 6,764,663 B2 | 7/2004 | Monaghan et al. | |
| 6,764,789 B1 | 7/2004 | Sekiguchi et al. | |
| 6,872,376 B2 | 3/2005 | Tanaka et al. | |
| 6,986,966 B2 | 1/2006 | Clarke et al. | |
| 7,033,696 B2 | 4/2006 | Clarke et al. | |
| 7,078,123 B2 | 7/2006 | Kazacos et al. | |
| 7,083,774 B2 | 8/2006 | Dormehl et al. | |
| 7,214,443 B2 | 5/2007 | Clarke et al. | |
| 7,265,456 B2 | 9/2007 | Hennessy | |
| 7,270,911 B2 | 9/2007 | Clarke et al. | |
| 7,297,437 B2 | 11/2007 | Clarke et al. | |
| 7,353,083 B2 | 4/2008 | Hennessy | |
| 7,452,486 B2 | 11/2008 | Martyak et al. | |
| 7,557,531 B2 | 7/2009 | Willets et al. | |
| 7,560,189 B2 | 7/2009 | Clarke et al. | |
| 7,625,662 B2 | 12/2009 | Vaisnys et al. | |
| 7,740,977 B2 | 6/2010 | Lepp et al. | |
| 7,855,005 B2 | 12/2010 | Sahu | |
| 7,919,204 B2 | 4/2011 | Sahu | |
| 7,927,731 B2 | 4/2011 | Sahu | |
| 7,993,932 B2 | 8/2011 | Winter | |
| 2001/0006745 A1 | 7/2001 | Bronoel et al. | |
| 2002/0119090 A1 | 8/2002 | Tanaka et al. | |
| 2003/0215695 A1 | 11/2003 | Suzuki et al. | |
| 2004/0241552 A1 | 12/2004 | Skyllas-Kazacos | |
| 2005/0244707 A1 | 11/2005 | Skyllas-Kazacos et al. | |
| 2005/0287436 A1 | 12/2005 | Kawashige et al. | |
| 2007/0072067 A1 | 3/2007 | Symons et al. | |
| 2009/0218984 A1 | 9/2009 | Parakulam | |
| 2010/0003586 A1 | 1/2010 | Sahu | |
| 2010/0090651 A1 | 4/2010 | Sahu et al. | |
| 2010/0092757 A1 | 4/2010 | Nair et al. | |
| 2010/0092843 A1 | 4/2010 | Conway | |
| 2010/0119937 A1 | 5/2010 | Winter | |
| 2010/0178533 A1 | 7/2010 | Whitehead et al. | |
| 2010/0261070 A1 | 10/2010 | Keshavarz et al. | |
| 2010/0291420 A1 | 11/2010 | Kazacos et al. | |
| 2011/0074357 A1 | 3/2011 | Parakulam et al. | |
| 2011/0117411 A1 | 5/2011 | Horne et al. | |
| 2011/0206960 A1 | 8/2011 | Winter | |
| 2011/0223450 A1 | 9/2011 | Horne et al. | |
| 2011/0223451 A1 | 9/2011 | Winter et al. | |
| 2012/0052340 A1 | 3/2012 | la O' et al. | |
| 2012/0058370 A1 | 3/2012 | Kell et al. | |

OTHER PUBLICATIONS

Izaki, M. et al., "Electrodeposition of Iron and Iron Alloys", Modern Electroplating, Fifth Edition, Feb. 24, 2011, pp. 309-325.
Miller, Amanda, "Ohio Researchers Study Iron Flow Battery Potential for Solar Storage", Retrieved at http://www.cleanenergyauthority.com/solar-energy-news/iron-flow-battery-potential-for-solar-storage-052511/, May 25, 2011, 3 pages.
Nguyen, T. et al., "Flow Batteries", Electrochemical Society Interface, vol. 19, No. 3, Fall 2010, pp. 54-56.
Perry, Mike, "Renaissance in Flow-Cell Technologies", United Technologies Research Center, Mar. 7, 2012, 18 pages.
Yang, Z. et al., "Electrochemical Energy Storage for Green Grid", Chemical Reviews, Sep. 1, 2010, 37 pages.
"Flow Battery", Wikipedia, http://en.wikipedia.org/wiki/Flow_battery, Jan. 27, 2014, 6 pages.
ISA Korean Intellectual Property Office, International Search Report and Written Opinion of PCT/US2013/058342, Dec. 2, 2013, 10 pages.

* cited by examiner

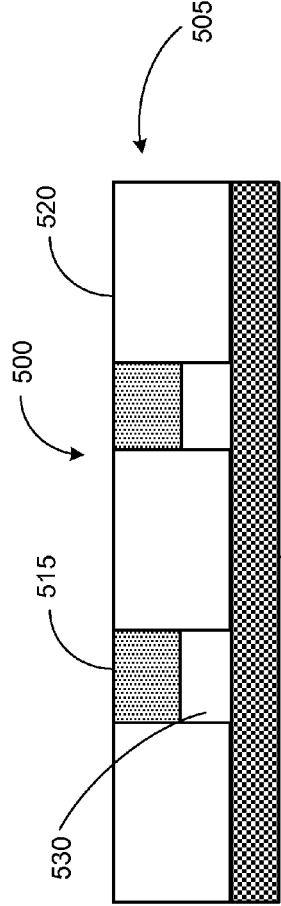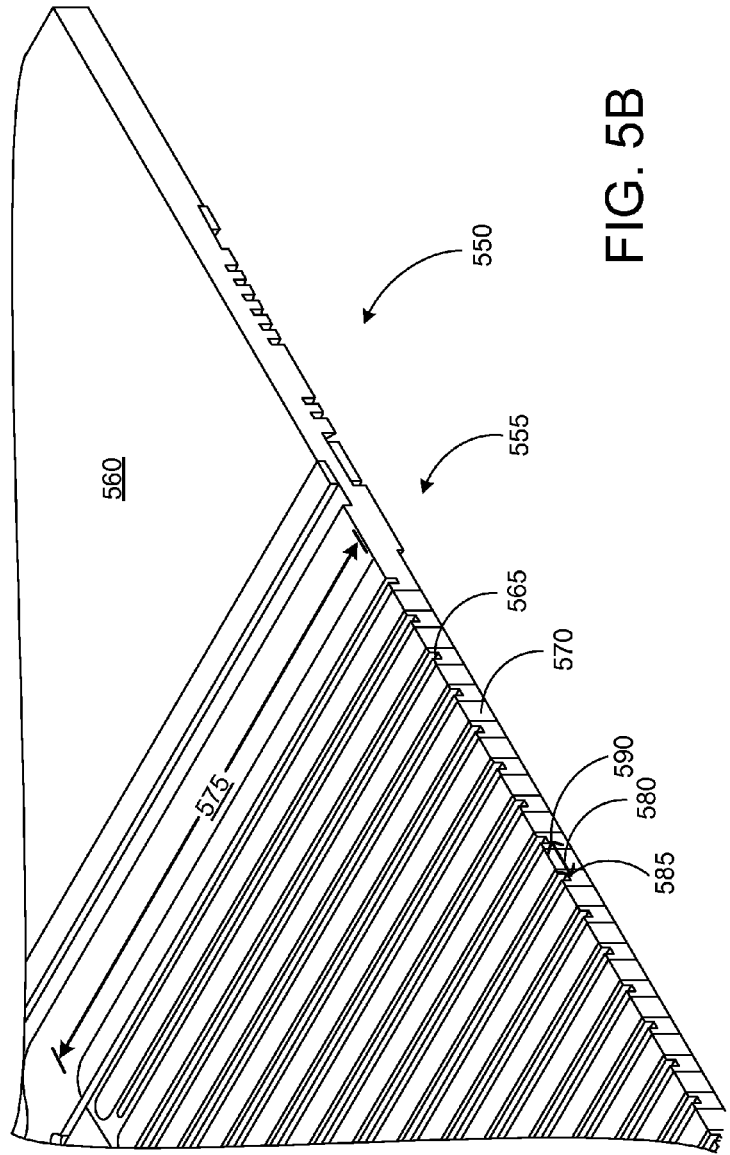

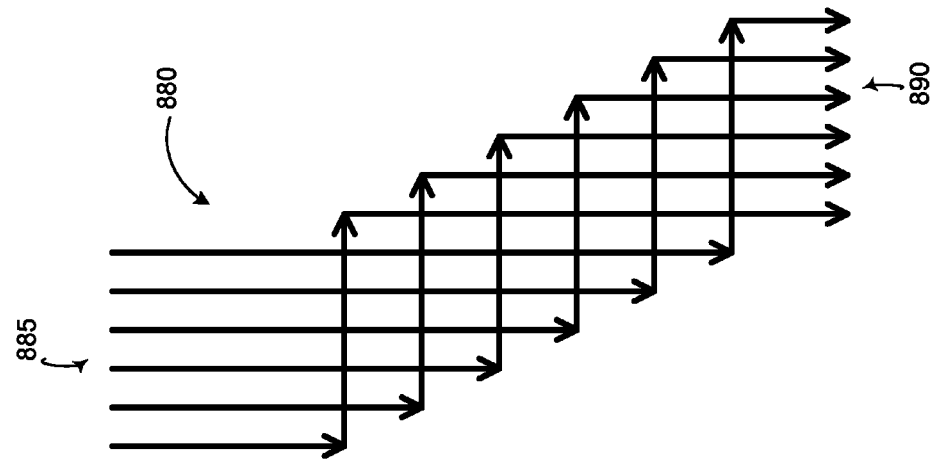
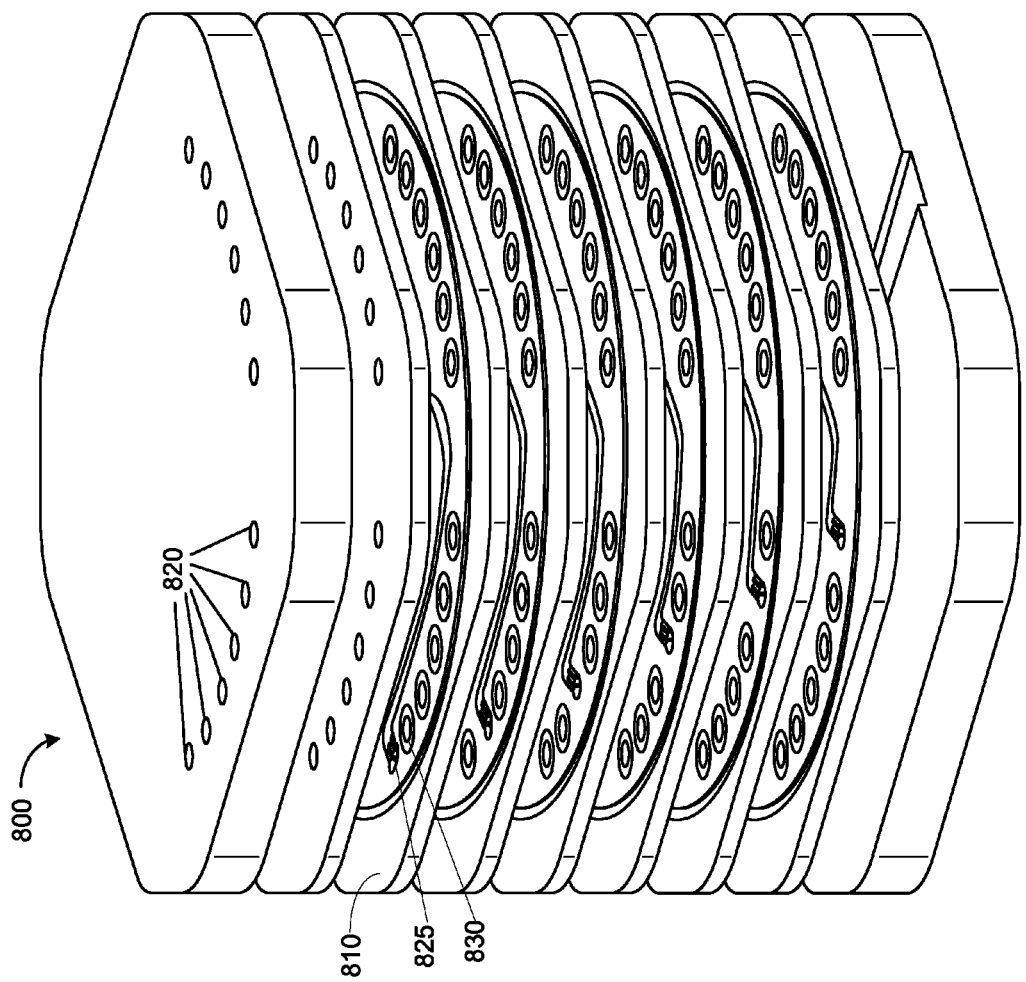

ously reverse redox reactions. Due to the decoupling of the electrolyte (energy capacity) from the stack (power module), a flow battery offers the ability to change energy storage capacity without altering the entire system, the ability to increase maximum power output with minimal system impact, as well as a reduction of part redundancy in comparison to other battery technologies. Hybrid flow batteries are distinguished by the deposit of one or more electro-active materials on an electrode. In hybrid battery systems, the energy stored by the redox battery may be limited by the amount of metal plated during charge and may accordingly be determined by the efficiency of the plating system as well as the available volume and surface area for plating.

REDOX AND PLATING ELECTRODE SYSTEMS FOR AN ALL-IRON HYBRID FLOW BATTERY

CROSS REFERENCE TO RELATED APPLICATIONS

The present application is a non-provisional of and claims priority to U.S. Provisional Application No. 61/697,202 filed Sep. 5, 2012 entitled, "All Iron Hybrid Flow Battery," and is a non-provisional of and claims priority to 61/778,160 filed Mar. 12, 2013 entitled, "Plating and Redox Electrode System and Design for an All Iron Redox Flow Battery," the entire contents of each of which are hereby incorporated by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

BACKGROUND AND SUMMARY

The reduction-oxidation (redox) flow battery is an electrochemical storage device that stores energy in a chemical form and converts the stored chemical energy to an electrical form via spontaneous reverse redox reactions. Due to the decoupling of the electrolyte (energy capacity) from the stack (power module), a flow battery offers the ability to change energy storage capacity without altering the entire system, the ability to increase maximum power output with minimal system impact, as well as a reduction of part redundancy in comparison to other battery technologies. Hybrid flow batteries are distinguished by the deposit of one or more electro-active materials on an electrode. In hybrid battery systems, the energy stored by the redox battery may be limited by the amount of metal plated during charge and may accordingly be determined by the efficiency of the plating system as well as the available volume and surface area for plating.

The all-iron hybrid flow battery allows for the use of an inexpensive electrolyte material, such as $FeCl_2$ (or $FeSO_4$), wherein on the positive electrode each of two $Fe^{2+}$ ions loses an electron to form $Fe^{3+}$ during charge, while each of two $Fe^{3+}$ ions gains an electron to form $Fe^{2+}$ during discharge. On the negative electrode, $Fe^{2+}$ ions receive two electrons and deposit as iron metal during charge, while iron metal loses two electrons and re-dissolves as $Fe^{2+}$ during discharge:

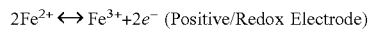

$2Fe^{2+} \longleftrightarrow Fe^{3+}+2e^-$ (Positive/Redox Electrode)

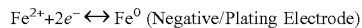

$Fe^{2+}+2e^- \longleftrightarrow Fe^0$ (Negative/Plating Electrode)

Hybrid flow batteries may use forced convection to pump redox electrolyte into a flow cell and across a redox plate, which conducts the electrolyte through channels allowing for redox reactions to occur at an adjacent redox electrode. The redox plate also allows for the removal of reacted electrochemical species away from the reaction sites. Forced convection ensures fresh, unreacted electrolyte to always be in contact with the electrode surface. Additionally, this configuration allows the entire electrode surface to be utilized, while simultaneously removing any products formed. The ferric/ferrous redox reaction occurs rapidly. As such, the redox plate design does not limit the performance of the IFB. However, by pumping electrolytes through graphite flow channels, unnecessary reactions may occur on both the surface of the channels and the surface of the electrode, leading to unnecessary ohmic losses. Further, an all-graphite or C/Graphite composite channels cannot be formed by inexpensive manufacturing methods such as injection molding.

The plating reaction at the negative electrode is the primary source of the IFB performance loss, as a result of the plating kinetics, resistance, and mass transport losses. For an all-iron hybrid flow battery, the battery capacity depends on the amount of solid iron that can be deposited at the negative electrode. Limited plating surface area thus results in higher overpotential on the negative electrode in order for the reaction to occur, while a limited plating volume may limit the overall battery capacity.

The inventors herein have devised systems and methods to address these issues. In one example, a system for a flow cell for a hybrid flow battery, comprising: one or more electrolyte inlets; one or more electrolyte outlets; a redox plate comprising a plurality of electrolyte flow channels; conductive inserts attached to the redox plate between adjacent electrolyte flow channels; a redox electrode attached to a surface of the redox plate; a plating electrode, comprising: a plurality of folded fins with an oscillating cross-section, the plurality of folded fins comprising: a first planar surface; a second planar surface, parallel to the first planar surface; a plurality of ridges intersecting the first and second planar surfaces such that the plurality of ridges divide the first planar surface into a first plurality of strips, and divide the second planar surface into a second plurality of strips; and a membrane barrier located between the redox electrode and the plating electrode. In this way, the capacity and performance of a hybrid flow battery may be maximized, through decreasing the reaction kinetics, mass transport, and ohmic resistance losses at both the plating and redox electrodes.

In another example, a system for an electrolyte flow plate for a hybrid flow battery, comprising: a polymeric plate comprising a plurality of electrolyte flow channels; and conductive inserts attached to the polymeric plate between adjacent electrolyte flow channels. In this way, redox reactions at the bottom of the redox flow channels may be minimized, decreasing the ohmic resistance of the redox reaction.

In yet another example, a plating electrode for a battery, comprising: a plurality of folded fins with an oscillating cross-section, the plurality of folded fins comprising: a first planar surface; a second planar surface, parallel to the first planar surface; a plurality of ridges intersecting the first and second planar surfaces such that the plurality of ridges divide the first planar surface into a first plurality of strips, and divide the second planar surface into a second plurality of strips. In this way, performance losses of the battery may be minimized by increasing the reacting surface of the plating electrode.

The above advantages and other advantages, and features of the present description will be readily apparent from the following Detailed Description when taken alone or in connection with the accompanying drawings.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF FIGURE DESCRIPTIONS

FIG. 1 schematically depicts an example embodiment of a hybrid flow battery system in accordance with the current disclosure.

FIG. 2 schematically depicts a cross-section of the battery depicted in FIG. 1.

FIG. 5A schematically depicts a redox plate-electrode assembly in accordance with the current disclosure.

FIG. 5B shows an example embodiment of a redox plate in accordance with the current disclosure.

Figure 6A:
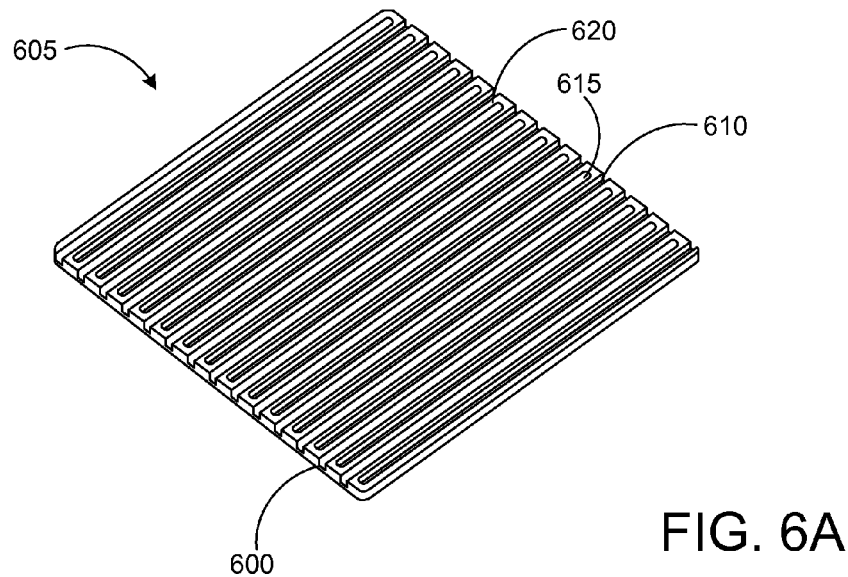

FIG. 6A shows an additional embodiment of a redox plate in accordance with the current disclosure.

Figure 6B:
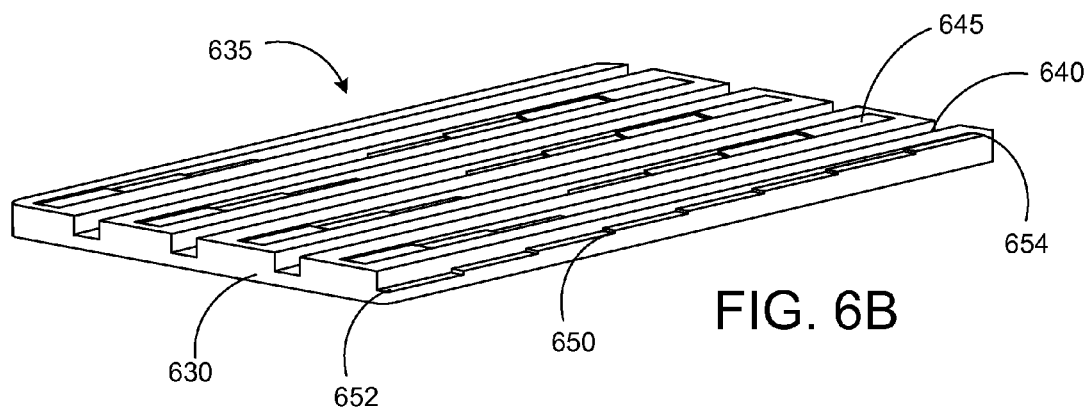

FIG. 6B shows an additional embodiment of a redox plate in accordance with the current disclosure.

Figure 6C:
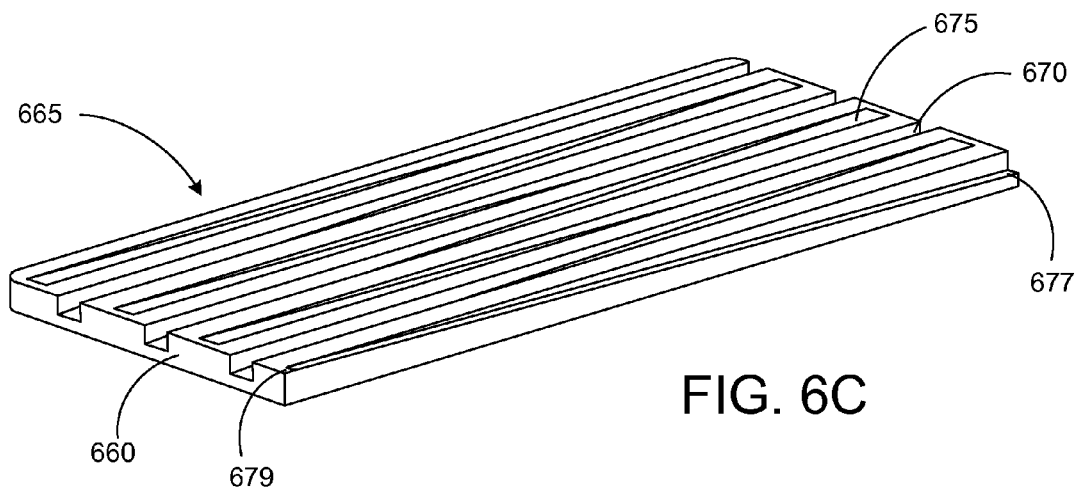

FIG. 6C shows an additional embodiment of a redox plate in accordance with the current disclosure.

Figure 7A:
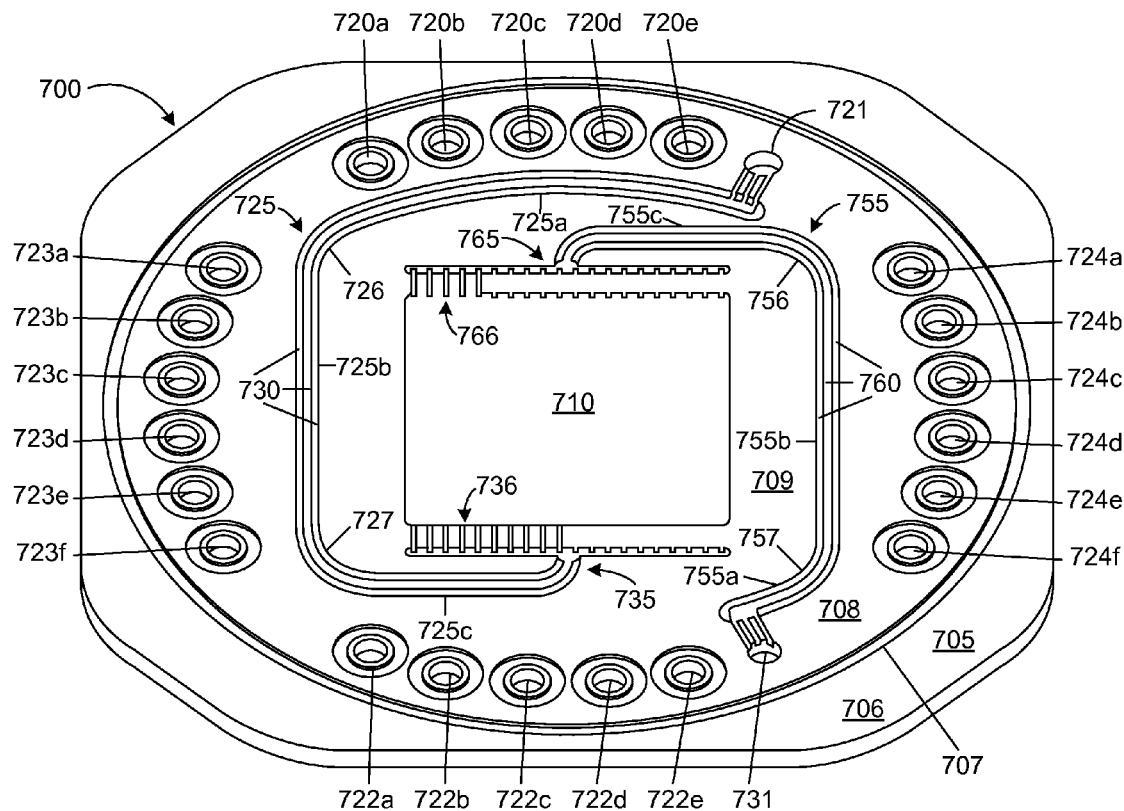

FIG. 7A shows, in schematic detail, an embodiment of a single flow cell in accordance with the current disclosure.

Figure 7B:
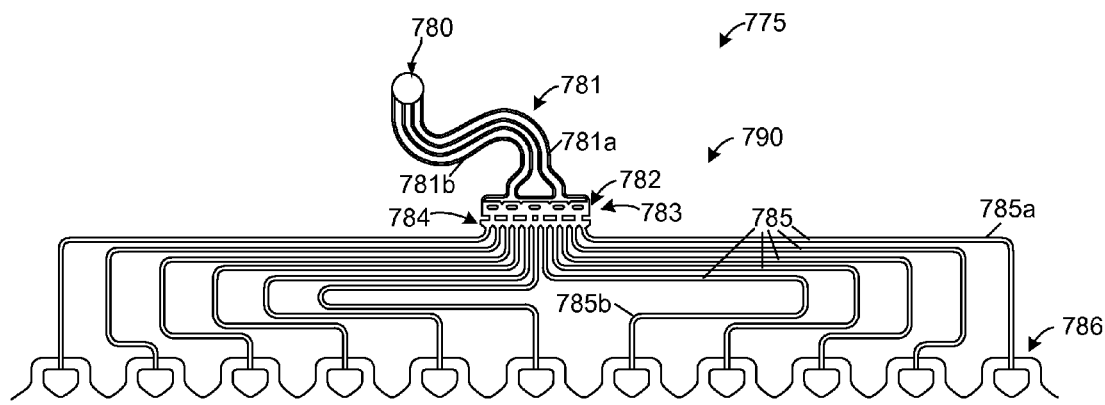

FIG. 7B shows, in schematic detail, a close-up view of a portion of the flow cell of FIG. 7A.

FIG. 8A shows, in schematic detail, an embodiment of a flow cell stack in accordance with the current disclosure.

FIG. 8B shows a diagram of electrolyte flow through the flow cell stack depicted in FIG. 8A.

FIGS. 3A, 3B, 3C, 3D, 4A, 4B, 4C, 5B, 6A, 6B, 6C, 7A, 7B, and 8A are drawn to scale, but it should be understood that other dimensions may be used without departing from the scope of this disclosure.

DETAILED SPECIFICATION

Figure 1:
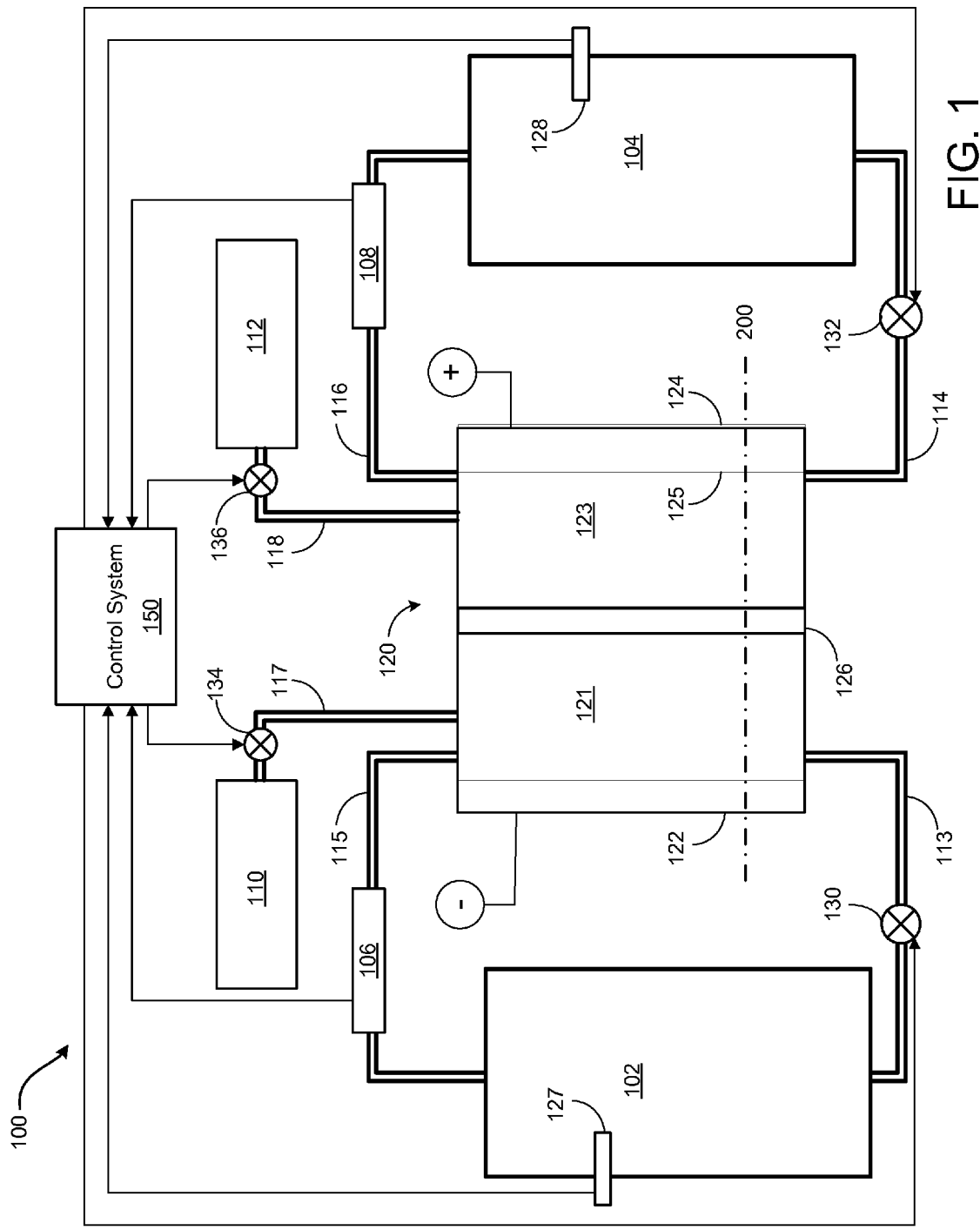

The following description relates to systems for an all-iron hybrid flow battery (IFB), such as the IFB schematically depicted in FIG. 1. The IFB may include redox and plating electrodes, membrane barriers, and redox and plating plates, as diagrammed in FIG. 2. The plating electrode may comprise a folded fin design, as shown in FIGS. 3A, 3B, 3C, 3D, 4A, 4B, and 4C. The plating electrode fins may comprise perforations, as shown in FIGS. 4A and 4C. The redox plate may include a robust polymer plate as well as C/Graphite composite inserts, as shown in FIGS. 5A and 5B. The redox and plating plates may further comprise interdigitated flow fields as shown in FIG. 6A. The flow channels may be stepped as shown in FIG. 6B, or sloped as shown in FIG. 6C. The redox and plating plates may be included in an internally manifold flow cell, as shown in FIGS. 7A and 7B. A plurality of flow cells may be assembled into a flow cell stack, as shown in FIG. 8A. The flow cell of FIG. 7A and the flow cell stack of FIG. 8A may facilitate an electrolyte flow pattern that reduces shunt current losses, such as the flow pattern depicted in FIG. 8B.

FIG. 1 shows a schematic diagram of an example embodiment of an all-iron hybrid flow battery (IFB) 100 in accordance with the present disclosure. While not depicted herein, other flow battery configurations may be used without departing from the scope of this disclosure.

IFB 100 comprises a plating electrolyte tank 102, a redox electrolyte tank 104, and one or more flow cells 120. Plating electrolyte tank 102 may include a plating electrolyte stored within, and redox electrolyte tank 104 may include a redox electrolyte stored within. The plating electrolyte and redox electrolyte may be suitable salts dissolved in water, such as $FeCl_2$ or $FeCl_3$ (or $FeSO_4$ or $Fe_2(SO_4)_3$) and other supporting electrolytes. The plating electrolyte and redox electrolyte may include the same salt at different molar concentrations.

Flow cell 120 may include negative reactor 121 and positive reactor 123. Negative reactor 121 may be fluidly coupled to plating electrolyte tank 102 via conduits 113 and 115. Similarly, positive reactor 123 may be fluidly coupled to redox electrolyte tank 104 via conduits 114 and 116. Negative reactor 121 may include plating electrode 122. Positive reactor 123 may include redox plate 124 and redox electrode 125. Negative reactor 121 and positive reactor 123 may be separated by barrier 126. Barrier 126 may embodied as a membrane barrier, such as an ion exchange membrane or a microporous membrane, placed between the plating electrolyte and redox electrolyte to prevent electrolyte crossover and provide ionic conductivity.

Components of flow cell 120 are described in further detail herein, and with regards to FIGS. 2-7. Cross section 200 of flow cell 120 is described herein and shown in FIG. 2.

Plating electrolyte may be accelerated from plating electrolyte tank 102 into fluid cell 120 via conduit 113 through the use of pump 130. Plating electrolyte may then flow back to plating electrolyte tank 102 via conduit 115. Similarly, redox electrolyte may be accelerated from redox electrolyte tank 104 into fluid cell 120 via conduit 114 through the use of pump 132. Redox electrolyte may then flow back to redox electrolyte tank 104 via conduit 116.

IFB 100 may also include negative side additive tank 110 and/or positive side additive tank 112. Additive tanks 110 and 112 may include an acid additive. Negative side additive tank 110 and positive side additive tank 112 may include different acid additives contained therein, or may include the same acid additive at different concentrations or pH values. Negative side additive tank 110 may be fluidly coupled to negative reactor 121 via conduit 117. In some embodiments, negative side additive tank 110 may be fluidly coupled to plating electrolyte tank 102. Similarly, positive side additive tank 112 may be fluidly coupled to positive reactor 123 via conduit 118, or may be fluidly coupled to redox electrolyte tank 104. The negative additive may be accelerated into the negative reactor 121 by negative additive pump 134. The positive side additive may be accelerated into positive reactor 123 by positive additive pump 136.

Pumps 130, 132, 134, and 136 may be controlled at least partially by a control system 150. Control system 150 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed.

Control system 150 may be configured to receive information from a plurality of sensors, such as sensors 106 and 108, and probes 127 and 128, and further configured to send control signals to the pumps described herein, and/or other actuators within IFB 100, such as one or more valves. Control system 150 may receive input data from the various sensors, process the input data, and trigger the pumps and/or other actuators in response to the processed input data based on instruction or code programmed therein corresponding to one or more routines.

Probe 127 may be disposed within, or otherwise coupled to plating electrolyte tank 102 in a manner that allows probe 127 to contact the plating electrolyte stored within plating electrolyte tank 102. Similarly, probe 128 may be disposed within, or otherwise coupled to redox electrolyte tank 104 in a manner that allows probe 128 to contact the redox electrolyte stored within redox electrolyte tank 102. Probes 127 and 128 may be used to determine and monitor the chemical properties of the electrolytes stored in tanks 102 and 104, respectively.

Sensors 106 and 108 may be disposed within or otherwise coupled to conduits 115 and 116, respectively, in a manner that allows the sensors to contact electrolyte returning from flow cell 120 to electrolyte tanks 102 and 104. Sensors 106 and 108 may determine or monitor chemical properties (such as concentration, potential, and pH) of electrolyte passing through conduit 115 and 116, respectively. In some embodiments, sensors 106 and 108 may be optical sensors configured to allow flow through of electrolyte.

Some embodiments of IFB 100 may have a plating electrolyte probe, plating electrolyte sensor, redox electrolyte probe, redox electrolyte sensor, or some combination thereof. Probes may also be placed inside the reacting portion of IFB 100 in negative reactor 121 and positive reactor 123.

Data collected from probes 127 and 128, from sensors 106 and 108, and from other sensors disposed within IFB 100 may be used by control system 150 to control pumps 130, 132, 134, and 136. For example, the flow rate of electrolyte through flow cell 120 may be increased by increasing the speed of pump 130 and/or pump 132. The pH of electrolyte in flow cell 120 and/or electrolyte tanks 102 and 104 may be altered by actuating pump 134 and/or pump 136. Pumps 130 and 132 may be actuated by control system 150 using different control routines. Similarly, pumps 134 and 136 may be actuated by control system 150 using different control routines.

Flow cell 120 may be included in a power module (not shown) which may be connected to a power source, such as a power grid or a renewable power source. The power source may be used to charge the power module and/or to store electrical energy in the electrolytes. Pumps 130, 132, 134, and 136 may be connected to the power module and/or the power source. The power module may be discharged through electrical loads, thus releasing electrical energy stored in the electrolytes.

Figure 2:
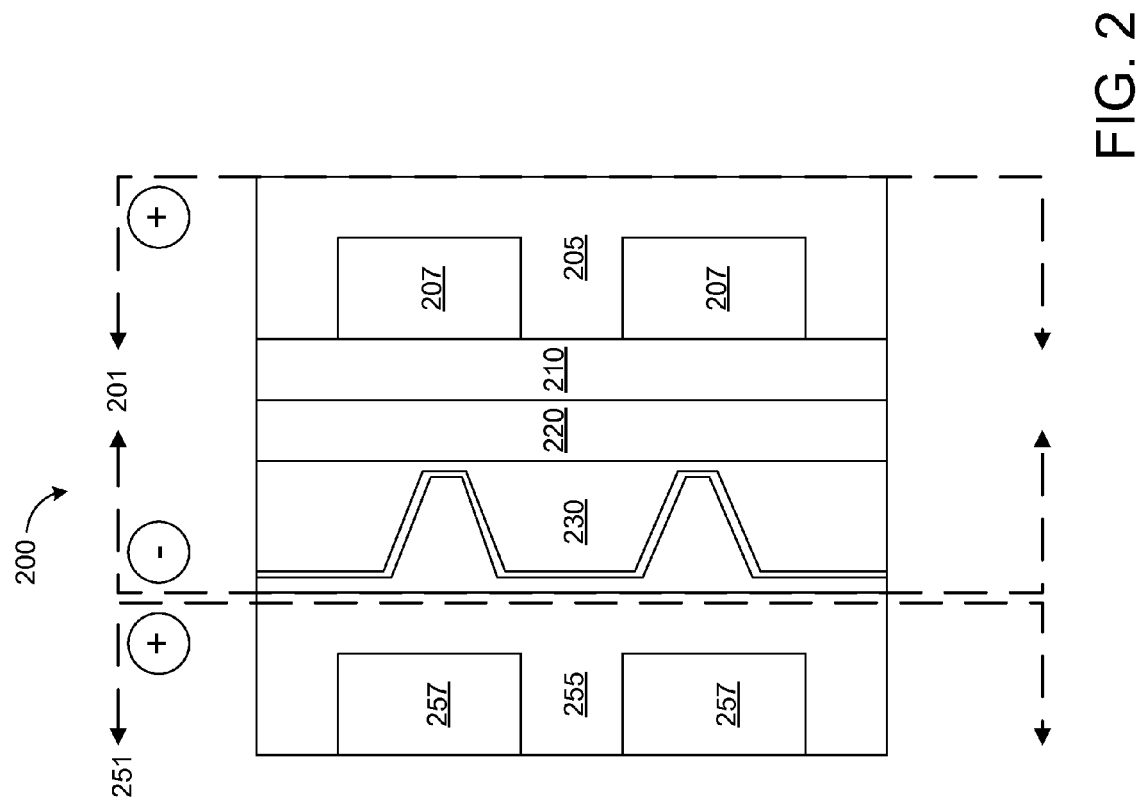

FIG. 2 shows a schematic diagram of a portion of cross-section 200 of the example IFB 100 as described herein and depicted in FIG. 1. As described with regard to FIG. 1, IFB 100 may include a plurality of flow cells. The flow cells may be aligned in parallel. Cross section 200 shows a first flow cell 201 stacked in parallel with a second flow cell 251. Only a portion of second flow cell 251 is shown for simplicity. It should be understood that multiple parallel flow cells may be appended to the diagram shown in FIG. 2 to form the flow cell battery of the IFB.

Flow cell 201 may comprise redox plate 205, redox electrode 210, barrier 220, and plating electrode 230. As shown in FIG. 2, redox plate 205, redox electrode 210, barrier 220, and plating electrode 230 may be stacked in this order, from the positive electrode to the negative electrode. Flow cell 251 may be stacked in parallel with flow cell 201, such that plating electrode 230 is placed adjacent to redox plate 255 of flow cell 251. In the example shown in FIG. 2, plating electrode 230 and redox plate 255 share a face. In some examples, a plating plate or other barrier may be placed between the plating electrode of one flow cell and the redox plate of the adjacent flow cell. An example of this embodiment is described herein and with regards to FIGS. 4A-C.

Redox plates 205 and 255 may comprise a set of channels 207 and 257, respectively. Channels 207 and 257 may facilitate the flow of electrolyte through the flow cell. Redox plates 205 and 255 may be made of a suitable conductive material, such as carbon, graphite or titanium. As discussed further herein, and with reference to FIG. 6A, the redox plates may be formed of multiple materials, including non-conductive materials such as plastic in addition to the conductive material.

Redox electrode 210 may be made of a suitable conductive material such as carbon, graphite, or titanium. Redox electrode 210 may be a high-surface electrode, allowing for a relatively large surface-to-volume ratio, and thus a relatively large reaction area. The ferrous/ferric redox reaction may occur on the surface of redox electrode 210.

In embodiments where the redox electrode is made from a carbon material, the carbon material may be electrochemically oxidized to further increase its surface area. The electrochemical oxidizing treatment may range from 500 C/g to 5000 C/g depending on the application and the nature of the carbon material. This may have the effect of enhancing the activity of the electrode due to the increase in surface area, the increase in O to C molar ratio, as well as the increase in —COOH functional groups on the surface. This electrode may be coupled with a set of electrolyte distribution channels to ensure the electrolyte is administered to the electrode properly. This channel geometry may be selected to ensure the pressure drop is minimized, while maximizing the forced convection through the electrode and minimizing the electrical resistances.

Plating electrode 230 may be made from a suitable substrate material on which $Fe^0$ may deposit and solidify during charging. The plating electrode may use a porous fin structure in order to increase plating kinetics and performance. Examples of plating electrode structure are described herein, and with reference to FIGS. 3A-3D and 4A-4C. Overpotential on the negative electrode side of flow cell 201 may be decreased by increasing the plating electrode surface area. Further, the performance of the plating electrode may be increased by reducing the plate thickness and fin height, and thus reducing ohmic losses. Pore size of the plating electrode may be selected to be large enough to prevent blockages from solidified $Fe^0$ during charging. For example, the pore size may be between 0.01 cm and 1 cm, but may be smaller or larger, depending on the storage capacity requirement of the battery. It may be advantageous to reduce the shared surface area of the redox electrode of the flow cell with the plating electrode of the flow cell through the membrane barrier. Plating capacity losses, as a result of ferric ions crossing over from the redox side and reacting with iron on the plating side, may be minimized by allowing for a relatively large volume of open space within the plating electrode, thus allowing for a high plating density (mAh/cm$^2$). The plating material may be made from carbon, iron, iron alloy, stainless steel, titanium, or any suitable material with a carbon, iron, iron alloy, or titanium coating.

Barrier 220 may be a microporous membrane, an ion exchange membrane, or a composite membrane. Barrier 200 may allow for electrical separation of the redox electrode and the plating electrode. The membrane may be made from a material which prevents crossover of the plating and redox electrolytes, and thus low battery coulombic efficiency loss. The membrane may be made from a material which also provides a high ionic conductivity, and thus low battery performance loss due to membrane resistivity.

Furthermore, to minimize iron corrosion reaction, a pH between 3 and 4 is desired for the iron plating reaction on the negative side, whereas to promote redox reaction kinetics, a pH less than 1 is desired for the ferrous and ferric ion redox reaction on the positive side. Thus, the membrane may be made from a material which also has a low proton crossover rate, and that has a high chemical and mechanical stability.

As such, the membrane used in the IFB battery of the current disclosure may be a microporous membrane that includes a single layer polyolefin separator (e.g. PP, PE, Polymethylpentene, or similar), laminates of at least two layers of polyolefins, a cation or anion exchange membrane, or laminates of microporous polyolefin layers and ion exchange membranes. The microporous polyolefin layers may be further coated or modified to improve lamination, ion exchange properties, or stability. The laminates may be created with pores large enough to accommodate anion or cation specific resins, beads, or gels to enhance the performance of the membrane.

Figure 3A:
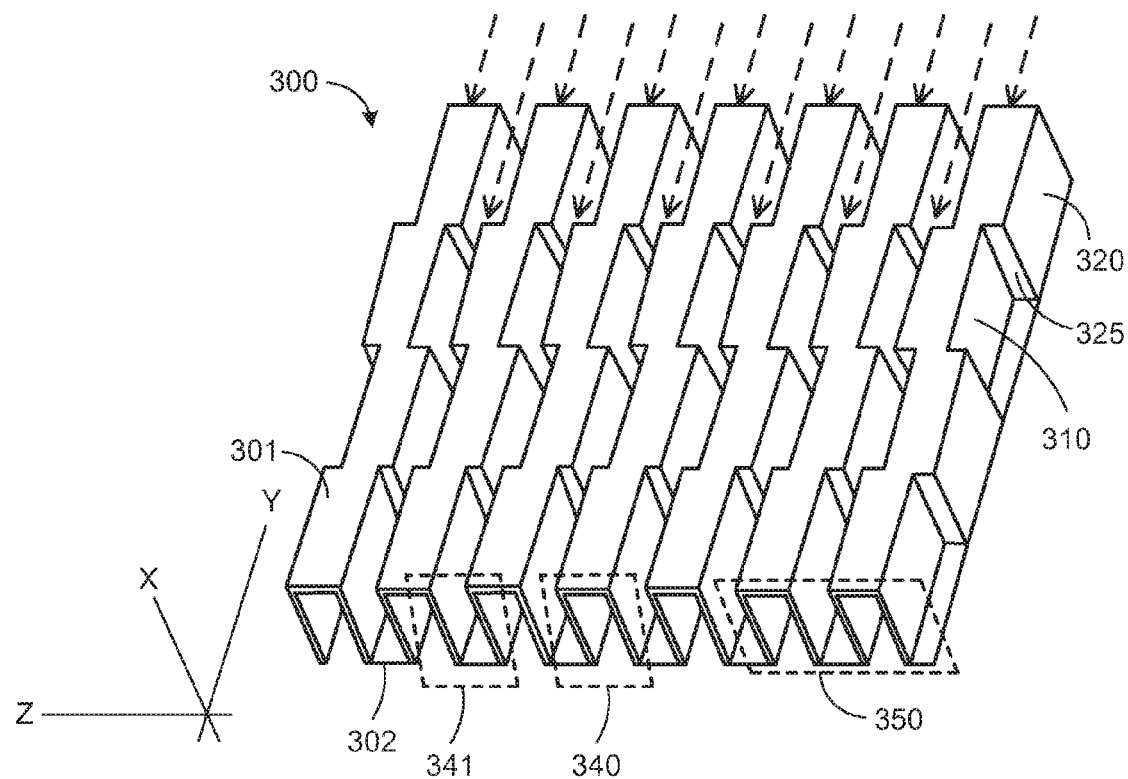
FIG. 3A depicts an example embodiment of a plating electrode in accordance with the current disclosure.

FIG. 3A shows one example fin structure 300 for a plating electrode in accordance with the current disclosure. Fin structure 300 comprises a folded, lanced offset (or serrated) fin structure. In the example depicted in FIG. 3A, the electrode face is arranged parallel to the membrane barrier (y-z plane) and is immediately adjacent to the plating electrolyte in the plating side of the cell, as shown in FIG. 2. The electrode plate may be plicate such that the cross section of the plate in the x-z plane may follow a sinusoidal curve. The cross section (350, see FIG. 3B) of this embodiment is sinusoidally square. As such, a first plane 301 is closer to the membrane than a second plane 302 that is further from the membrane. In this example, both first and second planes are parallel to the membrane.

Linear ridges 320 may run along the surface of the first plane in the y-direction at set intervals dividing the plane into strips along the y-axis. Alternating strips may be depressed into the second plane so that two strips may have a congruent edge in the y-z plane but some amount of separation in the x-plane. The separation may be bridged by a crossing ridge 325 connecting the consecutive parallel plate strips at right angles. The fin structure 300 may thus offer increased surface area extending along the depth of the oscillations.

The ridges may thus form serrations in the z-direction, further increasing the plate's surface area and allowing electrolyte to flow through the fin spacers. A first plane strip and its two adjacent ridges may define a fin 340. The second plane strip, separating adjacent fins, may be defined by a plate separator or a fin spacer 341. The fin serrations may be aligned along the z-axis such that they are in phase with the adjacent fins. In other words, the fin offset in the z-direction may occur at the same y-location, be in the same direction, and be offset by the same amount for successive fins.

Fin structure 300 thus has an electrode surface area that extends in three orthogonal vector directions. The 3-dimensional surface area configuration may increase the surface area without increasing the active area of the flow battery. The plating electrode material may also be porous such that depressions or holes run through or into the plate. In other disclosed embodiments, the plate may be arranged so that it is rotated about the x-axis by 90 degrees such that the ridges run along the z-direction. Electrolyte may thus flow in the y-direction, as indicated in FIG. 3 by dashed arrows, or in the z-direction.

Figure 3B:
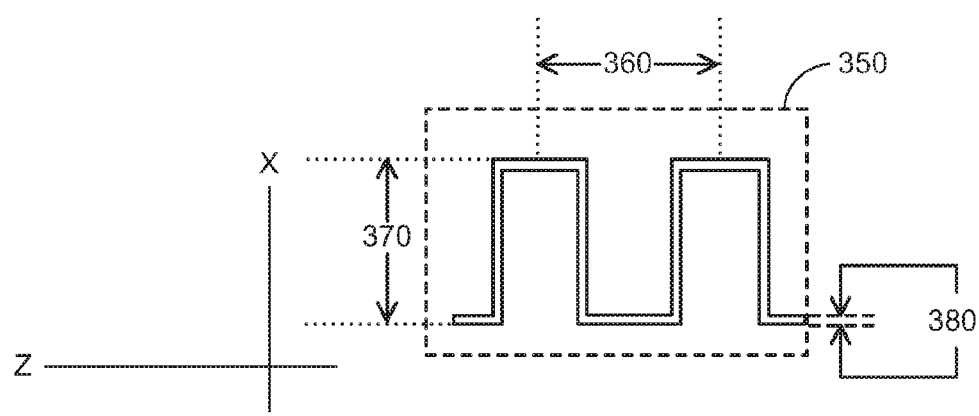
FIG. 3B depicts a cross section of the plating electrode depicted in FIG. 3A.

The sinusoidally square cross section 350 in the x-z plane depicted in FIG. 3 is shown in greater detail in FIG. 3B. Other embodiments may have sinusoidally triangular or purely sinusoidal cross sections. The cross section may be defined by a pitch 360, a height 370 and a thickness 380. As shown, pitch 360 is a half wavelength of the sinusoidal cross section. Height 370 represents the distance between first plane 301 and second plane 302. In other words, height 370 represents the depth of the depressed surface, or the depth of the plating electrode. Height 370 may be optimized to minimize the plating electrode ohmic resistance loss. Thickness 380 represents the distance from the face adjacent to the electrolyte to the face opposite the electrolyte. Thickness 380 may be set to the value of the thinnest material allowable, in order to minimize material costs, and to minimize the amount of space used by the plate, thus allowing for more active surface area and plating volume. However, embodiments using iron or an iron alloy as the plating electrode material may use a thicker electrode in order to increase the plate durability to abate ferric ion attacks on the metal iron surface. In some embodiments, including those where the plating electrode is made from iron or an iron alloy, it may be desirable to coat the surface of the electrode near the membrane interface with a non-conductive material such as fluoroelastomers (FKM) or perfluourinated elastomers (FFKM) to reduce the ferric ion attack on plated Fe$^0$ from redox side crossover.

Other variations on the disclosed plating electrode may have alternate plicate fin configurations including a herringbone fin, a serrated fin with a triangular profile (narrower on the top and wider on the bottom), a louvered fin, and/or a wavy fin.

Figure 3C:
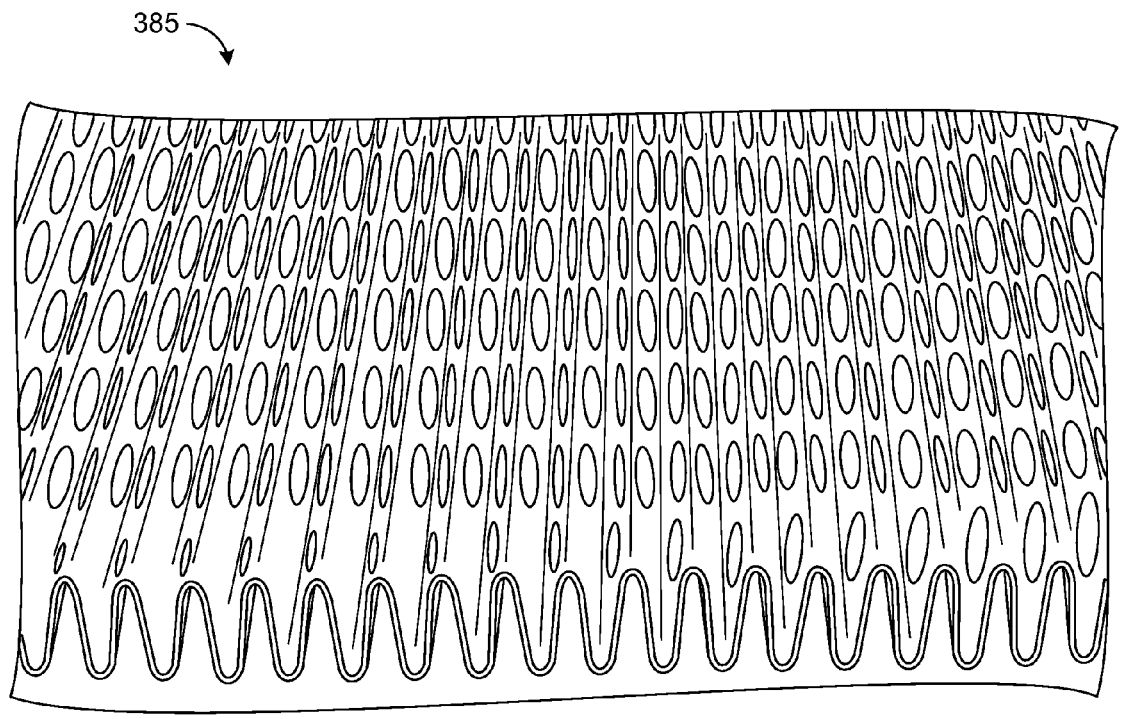
FIG. 3C depicts an alternative embodiment of a plating electrode in accordance with the current disclosure.
Figure 4A:
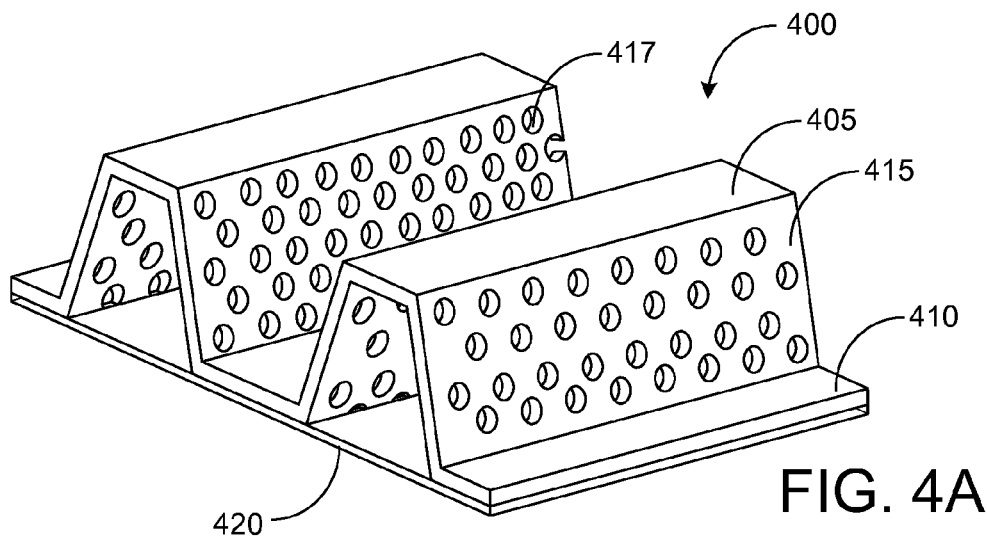
FIG. 4A depicts an additional embodiment of a plating electrode in accordance with the current disclosure.

FIG. 3C depicts an alternative embodiment of a plating electrode in accordance with the current disclosure. Plating electrode 385 comprises a louvered fin design that may comprise one of the cross sectional patterns described above with respect to fin structure 300, further including angled notches protruding from, and along the length of, the ridges. The ridges may be sharp (formed by the intersection of two linear surfaces). The ridges may also be curved and have an arched downward concavity in the negative x-direction as viewed from the y-z plane alternating with arched upward concavity in the upward x-direction with maximums at the first plane and minimums in the second plane.

Figure 3D:
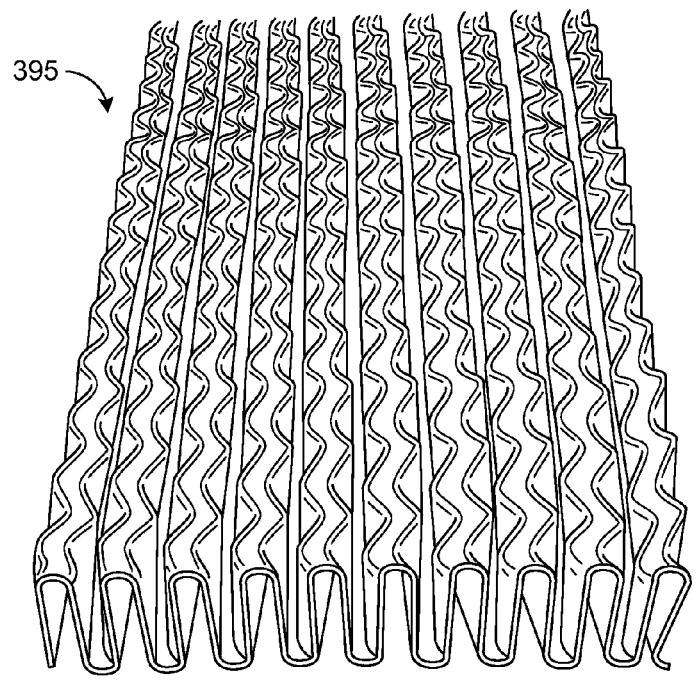
FIG. 3D depicts an alternative embodiment of a plating electrode in accordance with the current disclosure.

FIG. 3D depicts an alternative embodiment of a plating electrode in accordance with the current disclosure. Plating electrode 395 comprises a wavy plicate fin which may comprise a cross-section with a sinusoidal pattern similar to the pattern shown in FIG. 3B. In this embodiment, the ridges running along the surface of the first plane in a y-direction may be separated by an interval dividing the plane into strips along the y-axis. Alternating strips may then be depressed into the second plane so that two strips may have a congruent edge in the y-z plane but be some distance apart in the x plane, which may be traversed by a ridge connecting the consecutive parallel plates at right angles. In this embodiment, the fins are displaced sinusoidally in the in the z-direction. Similar to the previously mentioned embodiments, this configuration allows the electrode surface area a third dimension for expansion so that surface area may be increased without affecting the active area of the cell.

FIG. 4A shows another example fin structure 400 for a plating electrode in accordance with the current disclosure. Fin structure 400 comprises a folded, perforated fin structure. In the example depicted in FIG. 4A, the electrode face is arranged parallel to the membrane barrier and is immediately adjacent to the plating electrolyte in the plating side of the cell, as shown in FIG. 2. The electrode plate may be plicate such that the cross section of the plate in the x-z plane may follow a sinusoidal curve. The cross section (430, see FIG. 4B) of this embodiment is sinusoidally trapezoidal. As such, a first plate 405 is closer to the membrane than a second plate 410 that is further from the membrane. In this example, both first and second plates are parallel to the membrane and divided into parallel strips. In this example, the side plates 415 are angled such that strips of second plate 410 have a greater surface area than strips of first plate 405, but it should be understood that other configurations are possible without departing from the scope of this disclosure. The fins may be constructed out of carbon, iron, iron alloy, stainless steels, or titanium or other base materials and may be coated with a material such as iron or iron alloy.

Additionally, these fins may also include perforations 417, such as through holes, on all surfaces to increase the surface area plating density. The perforations are not limited to side plates 415, and in some embodiments perforations may also be included on first plates 405 and second plates 410. In some cases it might be advantageous to add perforations to the top plates 405 to reduce the ionic length of fin structure 400. Additionally, these fins may also include perforations 417 on all surfaces to increase the surface area plating density.

Figure 4B:
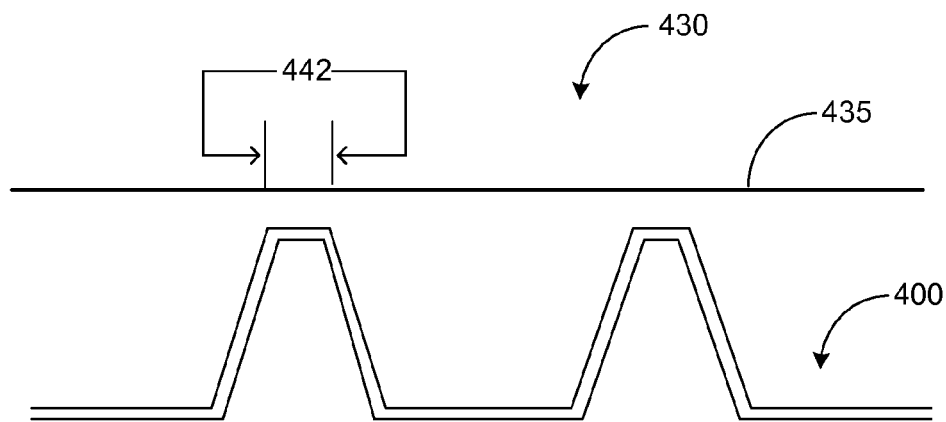
FIG. 4B depicts a cross section of the plating electrode depicted in FIG. 4A.
Figure 4C:
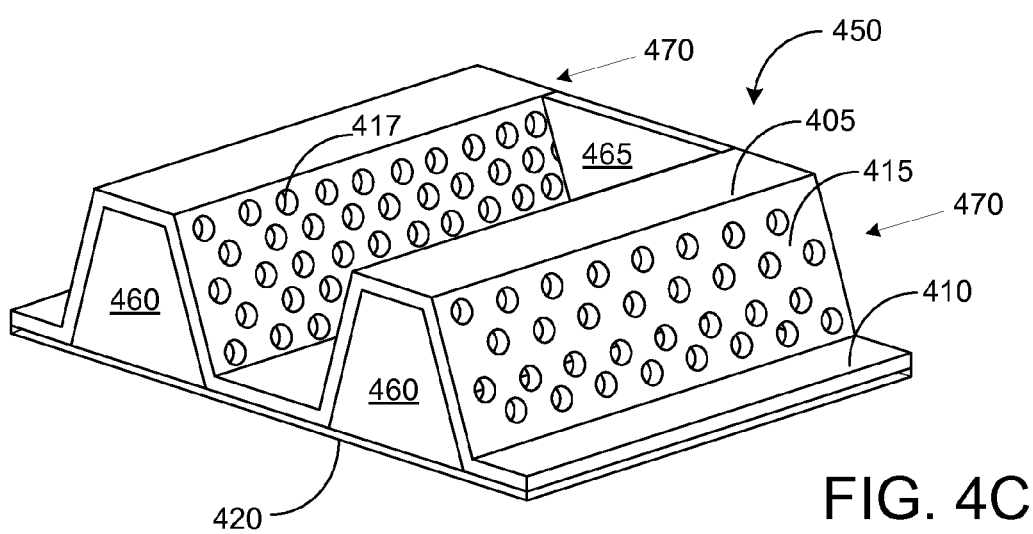
FIG. 4C depicts an additional alternate embodiment of a plating electrode in accordance with the current disclosure.

Other embodiments may have straight linear ridges along the y-or-z direction dividing the parallel plates into strips; however, they may share a ridge axis when viewed from the x-direction. In other words, as shown in FIG. 4B, the width of the strips of first plate 405 is less than the separation between adjacent strips in second plate 410. In this configuration, side plates 415 adjoining the top and bottom plate strips form an obtuse concave upward angle with the second plane and an obtuse concave downward angle with the first plane.

The fins may also be attached to base plate 420. Base plate 420 may be embodied as a current collector, bipolar plate, etc. and may run along, and adhere to, strips of second plate 410. Base plate 420 may be located immediately adjacent to the plate in the battery and be nearest the back of the redox plate of an adjacent flow battery. The base plate may be made from carbon, iron, iron alloy, stainless steel, titanium or any suitable material with a carbon, iron, iron alloy or titanium coating.

The number of fins per inch, or pitch, is defined as the peak-to-peak distance and defines the density of fins in the electrode. Generally, a larger pitch increases the surface area of the electrode and adds support to the substrate. If the pitch is too small, the membrane/separator has the potential to sag between the fins. However, the maximum pitch fabricated depends on the tooling available.

FIG. 4B depicts a cross-sectional view 430 of fin structure 400 in conjunction with membrane barrier 435. As shown in FIG. 4B, the width of each strip of first plate 405 is indicated at 442, the width of each strip of second plate 410 is indicated at 444. The strips of first plate 405 are closer to membrane barrier 435 than are the strips of second plate 410. The ratio of 442 to 444 may, for example, vary from 0.0 to 1.0. The ratio may be determined with regard to its proximity from membrane barrier 435, as ohmic resistance is lower closer to the membrane. Losses may therefore be minimized by embodiments with higher 442 to 444 ratios because more $Fe^0$ may deposit closer to membrane barrier 435 where the ohmic resistance may be lower, as opposed to further away from the membrane where ohmic resistance may be higher.

If width 442 is greater than width 444, the two plates closer to the membrane may connect with the plated metal during the plating operation, degrading the battery. If this occurs, the ionic path could be cut off causing a high ohmic resistance. Therefore, disclosed embodiments may have a value for width 442 that is smaller than or equal to a value for width 444. Typically, plating will occur closer to the membrane, so disclosed embodiments may maximize the space available for plating closer to the membrane.

FIG. 4C shows another example fin structure 450 for a plating electrode in accordance with the current disclosure. Fin structure 450 comprises features of fin structure 400, as well as inter-digitation plates 460 and 465. By incorporating inter-digitation plates 460 and 465, fin structure 450 comprises a series of flow channels 470 between the fin and the base plate. Flow channels 470 are open on one end and blocked on the other end. In this way, electrolyte flow may enter one end of the channel, but may not exit the opposing end. The inter-digitation plates may force the plating electrolyte to have a better distribution on the plating side. The interdigitation plates may form dead-ended inlet and outlet flow channels. Similarly, partially interdigitated flow field designs may be used without departing from the scope of this disclosure. Partially interdigitated flow field designs may include constricted inlet and outlet flow channels, as opposed to dead-ended inlet and outlet flow channels.

The systems described herein and depicted in FIGS. 2, 3A, 3B, 4A, 4B, and 4C may enable one or more systems. In one example, a plating electrode for a battery, comprising: a plurality of folded fins with an oscillating cross-section, the plurality of folded fins comprising: a first planar surface; a second planar surface, parallel to the first planar surface; a plurality of ridges intersecting the first and second planar surfaces such that the plurality of ridges divide the first planar surface into a first plurality of strips, and divide the second planar surface into a second plurality of strips. The plurality of ridges may be perpendicular to the first and second planar surfaces. The plurality of ridges may include a plurality of serrations. The first plurality of strips may have a first width, and the second plurality of strips may have a second width, the second width being greater than the first width. The fins may comprise a plurality of perforations. The first planar surface may be coated with a non-conductive material. The plurality of folded fins may be fabricated from iron, iron alloy, stainless steel, titanium or carbon. The plating electrode may further comprise a base plate coupled to the second plane such that the base plate, the plurality of ridges, and the first plurality of strips form a plurality of channels. The plating electrode may further comprise one or more interdigitation or partial interdigitation plates, each interdigitation or partial interdigitation plate being perpendicular to the base plate and intersecting with a first end of one or more channels such that the flow of an electrolyte is restricted through the first end of the one or more channels.

The redox reaction for ferrous/ferric ions on carbon occurs extremely fast when compared to the plating reaction (approximately 2 orders of magnitude). As such, the redox electrode does not limit battery performance. However, by pumping electrolytes through graphite flow channels, as shown in FIG. 2 for example, a number of unnecessary reactions may occur on the graphite surface of these channels. Eliminating the excess reaction area provided by the graphite surface of the channels on the redox plate may reduce the cost of production without effecting battery performance. Furthermore, it is preferable for redox reaction to occur on the high surface redox electrode material, instead of the flow channel, as the ohmic resistance losses at the redox electrode are much smaller than the ohmic resistance losses at the channel.

FIG. 5A shows a redox plate/electrode assembly 500 in which the flow channels are made from low-cost plastics instead of C/graphite. Redox plate/electrode assembly 500 may comprise redox plate 505, and redox electrode 510. Redox plate 505 may include plastic frame 515, and conductive inserts 520. Plastic frame 515 and conductive inserts 520 may be assembled to form a plurality of flow channels 530 for the conduction of electrolyte through assembly 500.

Redox electrode 510 may share a first face with a barrier such as a microporous membrane or ion exchange membrane (not shown) and a second face with redox plate 550. Redox electrode 510 may be a porous electrode, as described herein.

Plastic frame 515 may be manufactured from a low-cost plastic, such as PVC or Polyolefin. Plastic frame 515 may be constructed separately from conductive inserts 520. Plastic frame 515 may be created via machining, injection molding, or compression molding. Conductive inserts 520 may be manufactured from a material such as carbon, a carbon/graphite composite, or titanium, or other material capable of conducting electrons to and from the ferric/ferrous reaction occurring on the redox electrode 510 and capable of withstanding corrosion from ferric or ferrous ions. Conductive inserts 520 may form flow ribs when adhered to plastic frame 515, thus providing electrical conductivity for electrolyte flowing through channels 530. Conductive inserts 520 may be glued to the plastic frame 515 with epoxy, Viton, or other adhesive material. Other embodiments may use a mechanical lock-in feature to secure the conductive inserts to plastic frame 515. Alternately, plastic frame 515 may be formed using injection molding or compression molding directly onto the conductive inserts. Plastic frame 515 may be secured to conductive inserts 520 by mechanical features such as small holes or groves for liquid plastic to flow into during the molding process which may be incorporated into the conductive inserts.

Multiple channels 530 may flow linearly through the redox plate adjacent to the redox electrode that allow electrolyte to pass through redox side of the IFB. Channels 530 may run parallel or perpendicular to the fins of a disclosed plating electrode. Channels 530 may be direct flow through, serpentine, interdigitated, or partially interdigitated channels. Examples of channel configurations are described further herein and with regards to FIGS. 5B, 6A, 6B, and 6C.

FIG. 5B shows a perspective drawing of a redox plate 550 in accordance with the current disclosure. Plastic frame 555 is similar to plastic frame 515 depicted in FIG. 5A. However, plastic frame 555 may be manufactured as part of a larger plastic manifold plate 560.

Flow channels 565 direct electrolyte flows linearly through redox plate 550. Conductive inserts 570 provide electrical conductivity when in physical contact with a redox porous electrode and a plating electrode of an adjacent cell (not shown). Inserts 570 may each be in the shape of a rectangular prism with a long edge 575 that may be the length of redox plate 550. Multiple inserts 570 may be attached to plastic frame 555 so that they run parallel to an edge and are separated by a distance that is the width of channels 565. The protruding portion of the plate, referred to as flow ribs 580, may form a second edge 585 of a first channel and a first edge 590 of an adjacent second channel. The surface of the plate nearest the redox electrode may therefore be sinusoidally square.

Conductive plates of significant surface area cannot be constructed out of carbon/graphite composite material using injection molding due to the high graphite content, thus the use of plastic plates with C/graphite inserts allow for high volume manufacturing of redox plates. Further, the use of injection molding allows for greater part-to-part consistency and lower tolerance than graphite materials. Additionally, the use of a lower cost plastic plate material may allow for redox plates to be constructed at a much lower cost than their C/graphite composite/Ti counterparts.

Bipolar plates may be used in the redox flow battery to direct and transport electrolytes to the reaction sites and then removed reacted electrochemical species away from the reaction sites. The flow cell design of the current disclosure minimizes the three potential battery performance loss mechanisms by utilizing forced convection of the pumped electrolyte to maximize the electrode active surface area and minimize ohmic resistance. In this way, by utilizing forced convection, fresh electrolyte is ensured to always be on the catalyst surface, the electrode surface is completely utilized, and any product formation is quickly swept away.

Specifically, the inventors of the current disclosure may employ an interdigitated or a partially interdigitated flow field design to the field of redox flow batteries. When a conventional flow field is used, the reactants flow over the surface of the electrode. An interdigitated flow field, which includes dead-ended inlet and outlet channels, forces the incoming reactant to flow through the porous electrode in order to exit. A partially interdigitated flow field, which includes constricted (but not dead-ended) inlet and outlet channels, forces part of the incoming reactant to flow through the porous electrode in order to exit the flow field. In this way, pressure drops may be managed and balanced throughout the flow field. This design also converts the transport of the reactant and product to and from the catalyst layer from a diffusion dominant mechanism to a forced convection dominant mechanism. As a result, the diffusion (stagnant) layer in the backing layer of an electrode may be reduced from the whole backing layer thickness to a much thinner layer.

FIGS. 6A, 6B, and 6C show embodiments of redox plates that comprise interdigitated flow field designs. Similar embodiments may be used for partial interdigitated flow field designs without departing from the scope of this disclosure. Such embodiments may include constricted inlet and outlet flow channels, as opposed to dead-ended inlet and outlet flow channels.

FIG. 6A shows an embodiment of redox plate 600 comprising an interdigitated flow field 605 in accordance with the present disclosure. In one example, redox plate 600 comprises a plurality of interdigitated channels used to distribute fluid. The interdigitated channels include a plurality of alternating dead-ended inlet channels 610 and outlet channels 615 with the same channel depth. The inlet channels 610 and outlet channels 615 are arranged in an alternating fashion to form the interdigitated pattern. The channels are separated by ribs 620. The width and depth of the channels and the width of the ribs may be varied to suit the specific embodiment. The use of dead-ended channels forces the reactant to flow through the porous electrode.

The redox plate may be manufactured from a material with a high (60-100%) graphite composition or other suitable material. The redox plate may include a binder composed of any suitable material, including polyolefins (PE, PP or others), phenolic, vinyl ester, or other thermal set materials, a thermoplastic (such as PPS, PPSU, PEEK, PTFE, PFA), or other inorganic binding materials. As shown in FIGS. 5A and 5B, the bipolar plate and interdigitated channels may be formed of a robust polymer while the ribs may be formed of a C/Graphite composite. In this exemplary design, the channel depths may range from 0.5 to 1.5 mm, but may be deeper or shallower based on the size and design of the flow cell. The channel/land ratio is defined as the ratio between the width of the channels and the land, or inter-channel distance minus the channel width. In this example, the channel width is 1 mm, and the inter-channel distance is 2 mm, yielding a 1 mm land and a 1.0 channel/land ratio. The channel width and inter-channel distance may be modulated in order to produce a channel/land ratio for optimal performance for the specific flow cell application. This ratio may fall within the range of 0.5 to 3.0 but may be smaller or greater depending on the application.

FIG. 6B shows an alternative embodiment of a redox plate 630 comprising an interdigitated flow field 635 in accordance with the present disclosure. Redox plate 630 may be manufactured similarly to redox plate 600. In this embodiment, the inlet channels 640 and outlet channels 645 include a series of steps 650 extending from the channel depth 652 to the plate surface 654. In this example embodiment, there are 8 steps in each channel, but this number may be increased or decreased to change the fluid diffusion to optimize performance specific to the application.

FIG. 6C shows yet another embodiment of a redox plate 660 comprising an interdigitated flow field 665 in accordance with the present disclosure. Redox plate 660 may be manufactured similarly to redox plates 600 and 630. In this embodiment, the inlet channels 670 and outlet channels 675 are ramped or sloped from the channel depth 677 to the plate surface 679. In this embodiment, the fluid is evenly diffused as it enters the active area into the electrode on the membrane electrode assembly.

The systems described herein and depicted in FIGS. 2, 5A, 5B, 6A, 6B, and 6C may enable one or more systems. In one example, a system for a hybrid flow battery, comprising: a polymeric plate comprising a plurality of electrolyte flow channels; and conductive inserts attached to the polymeric plate between adjacent electrolyte flow channels. The electrolyte flow channels may be voids comprising a long edge running the length of a first side of the polymeric plate. The conductive inserts may comprise rectangular prisms having a long edge parallel to the long edge of the electrolyte flow channels, and running the length of a first side of the polymeric plate. The electrolyte flow channels and conductive inserts may form flow ribs that form a first edge of a first channel and a second edge of an adjacent second channel. The electrolyte flow channels may be interdigitated or partially interdigitated. The electrolyte flow channels may be sloped from a base of the polymeric plate to a top face of the polymeric plate. The electrolyte flow channels may include 2 or more steps from a base of the polymeric plate to a top face of the polymeric plate. The conductive inserts may be C/Graphite composite inserts.

The systems described herein and depicted in FIGS. 1, 2, 3A, 3B, 3C, 3D, 4A, 4B, 4C, 5A, 5B, 6A, 6B, and 6C may enable one or more systems. In one example, a system for a flow cell for a hybrid flow battery, comprising: one or more electrolyte inlets; one or more electrolyte outlets; a redox plate comprising a plurality of electrolyte flow channels; conductive inserts attached to the redox plate between adjacent electrolyte flow channels; a redox electrode attached to a surface of the redox plate; a plating electrode, comprising: a plurality of folded fins with an oscillating cross-section, the plurality of folded fins comprising: a first planar surface; a second planar surface, parallel to the first planar surface; a plurality of ridges intersecting the first and second planar surfaces such that the plurality of ridges divide the first planar surface into a first plurality of strips, and divide the second planar surface into a second plurality of strips; and a membrane barrier located between the redox electrode and the plating electrode. The electrolyte flow channels and conductive inserts may form flow ribs that form a first edge of a first channel and a second edge of an adjacent second channel. The plurality of fins may comprise a plurality of perforations.

One challenge the redox flow battery faces is that all the cells are hydraulically connected through an electrolyte circulation path. This can be problematic as shunt current can flow through the electrolyte circulation path from one series-connected cell to another causing energy losses and imbalances in the individual charge states of the cells.

Two losses that may be analyzed when building flow cell stacks are pumping losses and shunt current losses. The pumping losses may arise from pumping the plating electrolyte and redox electrolyte into and out of the flow cells. The shunting current losses may be due to the electrolyte being conductive and small shorts developing due to the electrolyte touching all of the cells. There may be a design to minimize these two losses and it may be defined as:

$$\min(\Sigma \text{Shunting Losses} + \Sigma \text{Pumping losses})$$

In order to reduce the pumping losses, the design requirements may call for short plumbing lengths with the smallest possible velocity (large hydraulic diameter). However, to reduce the shunting losses, the design may require long distances between cells and small plumbing areas.

The shunting losses may include at least two different types. The first type is due to cell to cell shunting (bipolar plate to bipolar plate). These losses can be significant for large stacks since the losses are additive:

$$\#\text{shunts} = 2 * \sum_{i=1}^{\#cells-1} i$$

The series is multiplied by two since there may be shunting on the inlet and outlet of the cell. The problem may be significantly worse for large stacks. The loss due to shunting is defined by:

$$\text{Loss} = \frac{V^2}{R}$$

Where R is the resistance of the electrolyte between the two cells and V is the voltage difference between the two cells. To determine the total shunting loss between the cells in the stack:

$$\text{Cell Shunt Loss} = 2 * \sum_{i=1}^{n-1} \sum_{j=i}^{n} \frac{(V_j - V_i)^2}{R_{ij}}$$

Where n is the number of cells in the stack. The losses may add up quickly since cell 1 shorts to cells 2, 3, . . . , n and cell 2 shorts to cells 3, 4, . . . , n. A larger resistance length, and therefore larger R, between cells may reduce this loss. This may be accomplished by adding a dielectric length between each of the bipolar plates. A smaller cell-to-cell voltage different ($V_j$–$V_i$) may also reduce this loss. This may be accomplished by separating a large stack into multiple smaller sub-stacks. In accordance with the present disclosure, a plastic frame may be added around the bipolar plate to direct electrolyte flow separately to different sub-stacks.

In some embodiments of the current disclosure, the resistance from cell to cell may be a function of the electrolyte resistivity, flow channel dimensions and the internal manifolds (both inlet and outlet manifolds).

$$R_{ij} = \rho_e \left[ 2 \frac{L_{channel}}{A_{channel}} + (j-i) * \frac{t_{pf}}{A_{manifold}} \right]$$

Where $\rho_e$ is the electrolyte resistivity, $L_{channel}$ is the length of the flow channel in the frame and $A_{channel}$ is the area of the channel defined below. The thickness of the frame is defined as $t_{pf}$ and the area of the internal manifolds is $A_{manifold}$.

To prevent or reduce such shunt currents, properties of the electrolytes used in an IFB, such as electrical and ionic conductivities, are characterized. Based on the above analysis results, shunt currents between cells can be reduced by increasing the ionic resistance between flow inlet and outlet ports. This can be achieved by increasing the length and/or reducing the cross-sectional area of the flow inlet and outlet paths.

Additionally, cells of similar voltages may be grouped to sub-stacks. Each sub-stack may comprise one or more cells. The inlet and outlet channels for reactants may change positions for each individual cell or sub-stack in order to minimize voltage differences and shunt current losses from high voltage cells to low voltage cells. The internal manifolds may be set up such that there is cascading from each Anode IN and Cathode IN, with each cell or sub-stack having reactants in parallel of other cells or sub-stacks.

FIG. 7A shows an embodiment of an internally manifolded frame 700 for a single flow cell in accordance with the present disclosure. Internally manifolded frame 700 may comprise frame 705 and flow field 710. Flow field 710 may be a redox plate or a plating plate. Internally manifolded frame 700 may include both redox and plating plates, and both redox and plating electrodes, although only one flow field is shown here. When included, flow field 710 may be on the top face of internally manifold frame 700, while the second flow field may be located on the bottom face, opposite the top face of internally manifold frame 700. As described herein and with regards to FIGS. 5A and 5B, frame 705 may be manufactured from a robust polymer. Flow field 710 may include flow channels cast as part of frame 705, and may further include conductive inserts for electrical conductivity. Flow channels may be interdigitated or partially interdigitated, and may be sloped or stepped as shown in FIGS. 6A-6C. A plating electrode may be an embodiment of the fin structures as shown in FIGS. 3A-D and 4A-4C.

Frame 705 may include an outer perimeter region 706, and an outer ridge 707. Outer perimeter region 706 and outer ridge 707 may not include routing for electrolyte flow, and may be used to facilitate the stacking of multiple internally manifolded frames into a flow cell stack, as described herein and depicted in FIG. 8A. Frame 705 may further include an inlet/outlet region 708, located interior to outer ridge 707. Frame 705 may further include a flow field region 709 located interior to inlet/outlet region 708.

Internally manifolded frame 700 may include several electrolyte inlet ports 720a-e and outlet ports 722a-e located within inlet/outlet region 708. Each frame 700 may include a single inlet port 721 and an outlet port 731 configured to direct electrolyte flow to and from flow field 710 via electrolyte flow paths. The remaining ports 720a-e and 722a-e may be used to direct electrolyte flow to other cells and/or sub-stacks. In the embodiment shown in FIG. 7A, internally manifolded frame 700 has six inlet ports and six outlet ports, facilitating six cells or six sub-stacks, but more or fewer inlet and outlet ports may be included, depending on the battery design. Internally manifolded frame 700 may also include several additional electrolyte inlet ports 723a-f and additional outlet ports 724a-f. If flow field 710 is a redox flow field, a second flow field on the opposite face of frame 705 may be a plating flow field, or vice-versa. As such, if inlet ports 720a-e and 721 route redox electrolyte to frame 705, inlet ports 723a-f may route plating electrolyte to frame 705. Similarly to the flow paths shown for flow field 710, one of inlet ports 723a-f and one of outlet ports 724a-f may be used to route electrolyte to and from a second flow field located on the opposite face from flow field 710. The remaining inlet and outlet ports may route electrolyte to other cells or sub-stacks within the flow cell stack. The inlet and outlet ports may not be located within flow field region 709 in order to maintain electrolyte flow path length, as described herein.

In the example shown in FIG. 7A, internally manifold frame 700 comprises an electrolyte inlet flow path 725 and an electrolyte outlet flow path 755. Electrolyte inlet flow path 725 comprises an inlet to manifold port 721 where electrolyte enters the manifold, electrolyte inlet flow channels 730 where electrolyte flows from the inlet port to the inlet of the battery, electrolyte inlet flow distribution manifold 735, and a plurality of flow field inlets 736. The inlet to manifold port 721 may be coupled to an external tube (not shown). Electrolyte inlet flow distribution manifold 735 may utilize an "ant farm" type of design to distribute electrolyte evenly into flow field 710. Such a configuration is described further herein and with regards to FIG. 7B. Electrolyte inlet flow path 725 may extend around flow field 710 on the border of flow field region 709 and inlet/outlet region 708. In this example, electrolyte inlet flow path 725 includes a first length 725a extending from inlet port 721 to first bend 726, a second length 725b extending from first bend 726 and second bend 727, and a third length 725c extending from second bend 727 to electrolyte inlet flow distribution manifold 735. Lengths 725a, 725b, and 725c may be continuous and allow electrolyte to flow directly from one to another.

In the example shown in FIG. 7A, electrolyte outlet flow path 755 comprises an inlet to manifold port 731 where electrolyte leaves the manifold, electrolyte outlet flow channels 760 where electrolyte flows from the outlet of the battery to the outlet port, electrolyte outlet flow distribution manifold 765, and a plurality of flow field outlets 766. The outlet to manifold port 731 may be coupled to an external tube (not shown). Electrolyte outlet flow distribution manifold 765 may utilize an "ant farm" type of design to distribute electrolyte evenly out of flow field 710. Electrolyte outlet flow path 725 may extend around flow field 710 on the border of flow field region 709 and inlet/outlet region 708. In this example, electrolyte outlet flow path 755 includes a first length 755a extending from outlet port 731 to first bend 757, a second length 755b extending from first bend 757 to second bend 756, and a third length 755c extending from second bend 756 to electrolyte outlet flow distribution manifold 765. Lengths 755a, 755b, and 755c may be continuous and allow electrolyte to flow directly from one to another.

Other flow cells sharing a flow cell stack with internally manifolded frame 700 may use different inlet and outlet ports, and thus require different electrolyte inlet paths and electrolyte outlet paths. For example, internally manifolded frame 700 may be configured to use electrolyte inlet port 720e to route electrolyte to the respective flow field 710 and electrolyte outlet port 722e to route electrolyte from flow field 710. In such an example, electrolyte inlet flow path 725 would decrease in length. More specifically, the first length 725a may be shortened, as it would thus extend from inlet port 720e to first bend 726. However, first length 755a would be extended, as it would thus extend from outlet port 722e to first bend 757. In this way, the combined inlet and outlet path length may remain the same for each internally manifold flow cell within a stack.

FIG. 7B shows an example electrolyte flow path 775 that may be implemented in the internally manifold frame 700 described herein and with regards to FIG. 7A. Electrolyte flow path 775 may be the equivalent of electrolyte inlet flow path 725 and/or electrolyte outlet flow path 755. Electrolyte flow path 775 may include a port 780, a set of flow channels 781, and flow distribution manifold 790. Flow distribution manifold 790 may include a series of junction stages and a series of manifold distribution channel sets fluidly coupling the junction stages. In this example, three junction stages are shown, but more or fewer may be used depending on the flow cell design. In this example, flow distribution manifold 790 includes first junction stage 782, second junction stage 784 and third junction stage 786. Flow distribution manifold 790 also includes a first set of manifold distribution channels 783 coupled between first junction stage 782 and second junction stage 784, and a second set of manifold distribution channels 785 coupled between second junction stage 784 and third junction stage 786. The second set of manifold distribution channels 785 may include a larger number of channels than does first set 783. Manifold distribution channels 785 may have a longer path length than do first set 783. Third junction stage 786 may be coupled to an additional set of manifold distribution channels, which may be further coupled to additional junction stages and additional sets of manifold distribution channels, with electrolyte flow eventually being distributed to a plating or redox flow field.

In the example where flow distribution manifold 790 is utilized as an inlet flow distribution manifold, electrolyte may enter port 780, which may be configured as an electrolyte inlet port. Port 780 may then distribute electrolyte through electrolyte flow channels 781, which may be configured as electrolyte inlet flow channels. Electrolyte flow channels 781a and 781b, (and others, where included) may have the same path length. Electrolyte flow channels 781 may then distribute electrolyte to first junction stage 782, and then be distributed to first set of manifold distribution channels 783. Individual manifold distribution channels in first set 783 may have the same path length. Electrolyte may then enter second junction stage 784, and then be distributed to second set of manifold distribution channels 785, and further to third junction stage 786.

Individual manifold distribution channels in second set 785 may have the same path length. For example, distribution channel 785a may have the same path length as distribution channel 785b. However, due to space constraints, channels 785a and 785b may have different architecture. As shown, channel 785a has a single turn, while channel 785b has a first and second turn. In this way, pressure drops may be minimized as electrolyte flows separate and pressure drops to each channel may be equalized by ensuring same electrolyte flow path length and geometries.

In the example where flow distribution manifold 790 is utilized as an outlet flow distribution manifold, electrolyte may enter third junction stage 786 and then be distributed to second set of manifold distribution channels 785. Electrolyte may then flow to second junction stage 784, first set of manifold distribution channels 783, and first junction stage 782. Electrolyte may then flow to flow channels 781, which may be configured as electrolyte outlet flow channels and to port 780, which may be configured as an electrolyte outlet port.

FIG. 8A shows an exemplary flow cell stack 800 in accordance with the present disclosure. Flow cell stack 800 includes of a plurality of flow cell sub-stacks 810. Each sub-stack may be composed of one or multiple cells. In this example embodiment, the flow channels (or manifolds) are kept fully within the stack, yielding an internally manifolded flow cell stack. In this example, each flow manifold has six sets of identical flow inlet ports 820 and outlet ports (not shown) aligned but including different flow inlet and outlet flow paths for redox and plating electrolytes of different sub-stacks. Each subs-tack 810 includes an inlet port 825 connecting electrolyte flow to a flow field as described herein and shown in FIG. 7A. Each sub-stack 810 also includes channels 830 directing electrolyte flow to other sub-stacks within flow cell stack 800. Electrolyte exiting outlet ports within flow cell stack 800 may be combined at a common electrolyte outlet (not shown). As shown in FIG. 7A, each flow cell in the flow cell stack includes an inlet electrolyte path and an outlet electrolyte path. By changing the location of the inlet and outlet ports, the lengths of the inlet electrolyte paths and outlet electrolyte paths may change from flow cell to flow cell. In order to maintain the same pressure drop across each flow cell, the sum of the inlet electrolyte path length and the outlet electrolyte path length may be kept the same for each cell within flow cell stack 800.

FIG. 8B shows an example of fluid flow direction 880 through an IFB stack comprised of six sub-stacks (or six cells). Flow may enter an IFB stack at 885, through inlet ports, such as inlet ports 820 as shown in FIG. 8A. Fluid entering the first port (leftmost, as shown in FIG. 8B) may flow through the inlet manifold port of the first sub-stack, enter a flow field within the sub-stack, and exit an outlet port of the first sub-stack. Electrolyte may then flow through a channel, bypassing the remaining sub-stacks, and exiting the flow cell stack at 890.

Similarly, fluid entering the second port may flow through a channel bypassing the first sub-stack, then flowing through an inlet manifold of the second sub-stack, entering a flow field and exiting from an outlet manifold port. The electrolyte may then flow through a channel, bypassing the remaining sub-stacks and exiting the flow cell stack at 890. Similarly, electrolyte may be directed to and from sub-stacks 3-6 in this example.

By separating the electrically conductive electrolyte paths, voltage differences between cells are managed and shunt current losses between cells are minimized, thus increasing the performance of the battery.

In accordance with the present disclosure, one way to minimize the cell to cell shunting losses due to the high voltage difference may be to break the stack up into smaller stacks or build sub-stacks within a single stack. Smaller stacks are not cost effective since there would be redundancy on non-repeat parts such as pressure plates and current collectors, so internal sub-stacks are assumed in this analysis. With internal sub-stacks different electrolyte feeds to and from the stack are employed and each feed provides electrolyte to that specific sub-stack. The shunting loss in this case is defined as:

$$\text{Substack Shunt Loss} = 2 * \sum_{i=1}^{n-1} \sum_{j=i}^{n} \frac{(V_j - V_i)^2}{R_{ij}}$$

Where n is the number of sub-stacks, V is the substack average voltage and R is the resistance between sub-stacks. As can be seen, it is advantageous to have a large resistance between sub-stacks. This resistance may be obtained by using long external plumbing. In this case the resistance, $R_{ij}$, is defined as:

$$R_{ij} = \rho_e \left[ \frac{2 * L_{channel}}{\#SS * A_{channel}} + 2 \frac{L_{tube}}{A_{tube}} + (I + j - 2) \frac{L_{manifold}}{A_{manifold}} \right]$$

Where $L_{tube}$ is the external tube length and $A_{tube}$ is the tube area.

The pumping losses may be broken up into at least four different areas including: inlet and outlet tubing, inlet and outlet internal manifolds, the frame flow channel, and the redox or plating plate. The pressure drop associated with the redox or plating plate is set due to its design. In an exemplary embodiment where the tubing is circular, the hydraulic diameter of the tubing may be defined as the diameter of the tubing, and the pressure drop in the inlet and outlet tubing and internal manifolds may be a function of said hydraulic diameter.

The pumping loss is defined as:

$$\text{Pumping loss} = \frac{\Delta P * Q}{\eta}$$

Where $\Delta P$ is the pressure drop in the plumbing (Pa), Q is the flow rate (m³/s) and η is the pump efficiency. The pressure drop is defined from the Darcy-Weisbach equation as:

$$\Delta P = \frac{1}{2} * f_d * \frac{L}{D_h} * \rho * v^2$$

Where $f_d$ is the friction factor, L is length (meters), $D_h$ is the hydraulic diameter (meters), ρ is the density (kg/m³) and υ is the velocity of the electrolyte (m/s). The friction factor is calculated assuming laminar flow by:

$$f_d = \frac{64}{Re}$$

And Re is the Reynolds number defined as:

$$Re = \frac{\upsilon * D_h}{\mu}$$

Where μ is the kinematic viscosity (m²/s).

When analyzing pumping losses in the frame, circular tubes cannot be assumed since the channels will be added to a flat sheet, so the hydraulic diameter needs to be calculated. To minimize pumping losses the perimeter of the channel may be minimized, while maximizing the area of the channel. In accordance with the present disclosure, a modified half circle may be machined in the channel. The hydraulic diameter of a non-circular channel may be calculated by:

$$D_h = \frac{4 * A}{P}$$

Where A is the cross sectional area of the channel and P is the channel perimeter. In some embodiments a channel width and depth may be allocated. Based on these two variables the optimal hydraulic diameter may be determined for at least the following scenarios:

Type 1: If Channel Depth=Channel Width/2 then $$\text{Channel Area} = \frac{\pi}{4} D_{channel}^2$$

$$\text{Channel Perimeter} = \pi * D_{Channel} + W_{Channel}$$

Type 2: If Channel Depth>Channel Width/2 then $$\text{Channel Area} = \frac{\pi * W_{channel}^2}{16} + \left(D_{Channel} - \frac{W_{Channel}}{2}\right) * W_{Channel}$$

$$\text{Channel Perimeter} = \pi * \frac{W_{Channel}}{2} + 2 * \left(D_{Channel} - \frac{W_{Channel}}{2}\right) + W_{Channel}$$

Type 3: If Channel Depth < Channel Width/2 then $$\text{Channel Area} = \frac{\pi * D_{Channel}^2}{4} + (W_{Channel} - D_{Channel}) * D_{Channel}$$

$$\text{Channel Perimeter} = \pi * D_{Channel} + (W_{Channel} - D_{Channel}) * W_{Channel}$$

Depending on the maximum depth constraints of the picture frame, any of these or other channel configurations may be used—in order to minimize both the pumping losses and shunt current losses.

It will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A system for a flow cell for a hybrid flow battery, comprising:
   one or more electrolyte inlets;
   one or more electrolyte outlets;
   a redox plate, comprising:
      a plurality of electrolyte flow channels;
      conductive inserts attached to the redox plate between adjacent electrolyte flow channels; and
      a redox electrode attached to a surface of the redox plate;
      where the conductive inserts have a long edge parallel to a long edge of the electrolyte flow channels, the long edge of the conductive inserts extending along a first side of a polymeric plate;
   a plating electrode, comprising a plurality of folded fins with an oscillating cross-section, the plurality of folded fins comprising:
      a first planar surface;
      a second planar surface, parallel to the first planar surface and displaced from the first planar surface in a first direction, the first direction being normal to the first and second planar surfaces and extending from the first planar surface toward the second planar surface;
      a plurality of ridges intersecting the first and second planar surfaces such that the plurality of ridges divides the first planar surface into a first plurality of strips, and divides the second planar surface into a second plurality of strips;
      a first plurality of flow channels adjacent to the first plurality of strips in the first direction; and
      a second plurality of flow channels adjacent to the second plurality of strips in a second direction, the second direction being opposite the first direction; and
   a membrane barrier located between the redox electrode and the plating electrode.

2. The system of claim 1, wherein the electrolyte flow channels and conductive inserts form flow ribs that form a first edge of a first channel and a second edge of an adjacent second channel.

3. The system of claim 1, wherein the plurality of folded fins comprises a plurality of perforations.

4. A system for an electrolyte flow plate for a hybrid flow battery, comprising:
   a polymeric plate comprising a plurality of electrolyte flow channels; and
   a plurality of conductive inserts attached to the polymeric plate between adjacent electrolyte flow channels;
   where a length of the conductive inserts is greater than a width of the conductive inserts, the length extending along a first side of the polymeric plate;
   wherein the electrolyte flow channels are voids comprising a long edge extending the length of the first side of the polymeric plate.

5. The system of claim 4, wherein the conductive inserts comprise rectangular prisms having a long edge parallel to the long edge of the electrolyte flow channels, and extending the length of the first side of the polymeric plate.

6. The system of claim 5, wherein the electrolyte flow channels and conductive inserts form flow ribs that form a first edge of a first channel and a second edge of an adjacent second channel.

7. The system of claim 6, wherein the electrolyte flow channels are sloped from a base of the polymeric plate to a top face of the polymeric plate.

8. The system of claim 6, wherein the electrolyte flow channels include two or more steps from a base of the polymeric plate to a top face of the polymeric plate.

9. The system of claim 4, where the electrolyte flow channels are interdigitated or partially interdigitated.

10. The system of claim 4, wherein the conductive inserts are Carbon/Graphite composite inserts.

11. A plating electrode for a battery, comprising:
   a plurality of folded fins with an oscillating cross-section, the plurality of folded fins comprising:
      a first planar surface;
      a second planar surface, parallel to the first planar surface, and displaced from the first planar surface in a first direction, the first direction being normal to the first and second planar surfaces and extending from the first planar surface toward the second planar surface;
      a plurality of ridges intersecting the first and second planar surfaces such that the plurality of ridges divides the first planar surface into a first plurality of strips, and divides the second planar surface into a second plurality of strips;
      a first plurality of flow channels adjacent to the first plurality of strips in the first direction; and
      a second plurality of flow channels adjacent to the second plurality of strips in a second direction, the second direction being opposite the first direction.

12. The plating electrode of claim 11, where the plurality of ridges is perpendicular to the first and second planar surfaces.

13. The plating electrode of claim 12, where the plurality of ridges includes a plurality of serrations.

14. The plating electrode of claim 11, where the first plurality of strips has a first width, and the second plurality of strips has a second width, the second width being greater than the first width.

15. The plating electrode of claim 11, where the plurality of folded fins comprises a plurality of perforations.

16. The plating electrode of claim 11, where the first planar surface is coated with a non-conductive material.

17. The plating electrode of claim 11, where the plurality of folded fins is fabricated from iron, an iron alloy, stainless steel, titanium, or carbon.

18. The plating electrode of claim 11, further comprising:
   a base plate coupled to the second planar surface such that the base plate, the plurality of ridges, and the first plurality of strips form a plurality of channels.

19. The plating electrode of claim 18, further comprising:
   one or more interdigitation or partial interdigitation plates, each interdigitation or partial interdigitation plate being perpendicular to the base plate and intersecting with a first end of the plurality of channels such that a flow of an electrolyte is restricted through the first end of the plurality of channels.

* * * * *